United States Patent
Yang

(10) Patent No.: US 10,326,761 B2
(45) Date of Patent: *Jun. 18, 2019

(54) WEB-BASED USER AUTHENTICATION TECHNIQUES AND APPLICATIONS

(71) Applicant: NOK NOK LABS, INC., Palo Alto, CA (US)

(72) Inventor: Ka Yang, San Jose, CA (US)

(73) Assignee: Nok Nok Labs, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/595,460

(22) Filed: May 15, 2017

(65) Prior Publication Data

US 2017/0250982 A1    Aug. 31, 2017

Related U.S. Application Data

(63) Continuation of application No. 14/268,733, filed on May 2, 2014, now Pat. No. 9,654,469.

(51) Int. Cl.
G06F 21/32 (2013.01)
H04L 29/06 (2006.01)
(Continued)

(52) U.S. Cl.
CPC .......... *H04L 63/0861* (2013.01); *G06F 21/32* (2013.01); *G06K 9/00288* (2013.01);
(Continued)

(58) Field of Classification Search
None
See application file for complete search history.

(56) References Cited

U.S. PATENT DOCUMENTS 5,280,527 A    1/1994  Gullman et al.
5,764,789 A    6/1998  Pare, Jr. et al.
(Continued)

FOREIGN PATENT DOCUMENTS

CN    1705925 A    12/2005
CN    101394283 A    3/2009
(Continued)

OTHER PUBLICATIONS

Abate A., et al.,"2D and 3D face recognition: A survey", 2007, pp. 1885-1906.
(Continued)

*Primary Examiner* — Fatoumata Traore
(74) *Attorney, Agent, or Firm* — Nicholson De Vos Webster & Elliott LLP

(57) ABSTRACT

A system, apparatus, method, and machine readable medium are described for performing user authentication. For example, one embodiment of a system comprises: media capture logic implemented as a component within a browser executed on a client, the media capture logic configured to capture a user's voice from a microphone on a client or images of the user's face or other portion of the user's body from a camera on the client, the media capture logic exposing an application programming interface (API); and a web authentication application implemented as another component within the browser for communicating with an authentication server to perform biometric authentication of a user, the web authentication application making calls to the API of the media capture logic to capture raw biometric data comprising the user's voice from the microphone and/or images of the user's face or other portion of the user's body from the camera, the web authentication application to implement a biometric authentication process to authenticate the user with the raw biometric data.

24 Claims, 14 Drawing Sheets

(51) Int. Cl.
  *G06K 9/00* (2006.01)
  *H04L 9/32* (2006.01)
  *H04L 29/08* (2006.01)
(52) U.S. Cl.
  CPC ............ *H04L 9/3231* (2013.01); *H04L 67/02* (2013.01); *H04L 9/32* (2013.01)

(56) References Cited

U.S. PATENT DOCUMENTS

| | | |
|---|---|---|
| 6,035,406 A | 3/2000 | Moussa et al. |
| 6,088,450 A | 7/2000 | Davis et al. |
| 6,178,511 B1 | 1/2001 | Cohen et al. |
| 6,270,011 B1 | 8/2001 | Gottfried |
| 6,377,691 B1 | 4/2002 | Swift et al. |
| 6,510,236 B1 | 1/2003 | Crane et al. |
| 6,588,812 B1 | 7/2003 | Garcia et al. |
| 6,618,806 B1 * | 9/2003 | Brown .................... G06F 21/32 709/225 |
| 6,751,733 B1 | 6/2004 | Nakamura et al. |
| 6,801,998 B1 | 10/2004 | Hanna et al. |
| 6,842,896 B1 | 1/2005 | Redding et al. |
| 6,938,156 B2 | 8/2005 | Wheeler et al. |
| 7,155,035 B2 | 12/2006 | Kondo et al. |
| 7,194,761 B1 | 3/2007 | Champagne |
| 7,194,763 B2 | 3/2007 | Potter et al. |
| 7,263,717 B1 | 8/2007 | Boydstun et al. |
| 7,444,368 B1 | 10/2008 | Wong et al. |
| 7,487,357 B2 | 2/2009 | Smith et al. |
| 7,512,567 B2 | 3/2009 | Bemmel et al. |
| 7,698,565 B1 * | 4/2010 | Bjorn .................... G06F 21/32 382/115 |
| 7,865,937 B1 | 1/2011 | White et al. |
| 7,941,669 B2 | 5/2011 | Foley et al. |
| 8,060,922 B2 | 11/2011 | Crichton et al. |
| 8,166,531 B2 | 4/2012 | Suzuki |
| 8,245,030 B2 | 8/2012 | Lin |
| 8,284,043 B2 | 10/2012 | Judd et al. |
| 8,291,468 B1 | 10/2012 | Chickering |
| 8,353,016 B1 | 1/2013 | Pravetz et al. |
| 8,359,045 B1 | 1/2013 | Hopkins, III |
| 8,412,928 B1 | 4/2013 | Bowness |
| 8,458,465 B1 | 6/2013 | Stern et al. |
| 8,489,506 B2 | 7/2013 | Hammad et al. |
| 8,516,552 B2 | 8/2013 | Raleigh |
| 8,526,607 B2 | 9/2013 | Liu et al. |
| 8,555,340 B2 | 10/2013 | Potter et al. |
| 8,561,152 B2 | 10/2013 | Novak et al. |
| 8,584,219 B1 | 11/2013 | Toole et al. |
| 8,584,224 B1 | 11/2013 | Pei et al. |
| 8,607,048 B2 | 12/2013 | Nogawa |
| 8,646,060 B1 | 2/2014 | Ben |
| 8,713,325 B2 | 4/2014 | Ganesan |
| 8,719,905 B2 | 5/2014 | Ganesan |
| 8,776,180 B2 | 7/2014 | Kumar et al. |
| 8,843,997 B1 | 9/2014 | Hare |
| 8,856,541 B1 | 10/2014 | Chaudhury et al. |
| 8,949,978 B1 | 2/2015 | Lin et al. |
| 8,958,599 B1 | 2/2015 | Starner |
| 8,978,117 B2 | 3/2015 | Bentley et al. |
| 9,015,482 B2 | 4/2015 | Baghdasaryan et al. |
| 9,032,485 B2 | 5/2015 | Chu et al. |
| 9,083,689 B2 | 7/2015 | Lindemann et al. |
| 9,161,209 B1 | 10/2015 | Ghoshal et al. |
| 9,171,306 B1 | 10/2015 | He et al. |
| 9,172,687 B2 | 10/2015 | Baghdasaryan et al. |
| 9,219,732 B2 | 12/2015 | Baghdasaryan et al. |
| 9,306,754 B2 | 4/2016 | Baghdasaryan et al. |
| 9,317,705 B2 | 4/2016 | O'Hare et al. |
| 9,367,678 B2 | 6/2016 | Pal et al. |
| 9,396,320 B2 | 7/2016 | Lindemann |
| 9,698,976 B1 | 7/2017 | Statica et al. |
| 2001/0037451 A1 | 11/2001 | Bhagavatula et al. |
| 2002/0010857 A1 | 1/2002 | Karthik |
| 2002/0016913 A1 | 2/2002 | Wheeler et al. |
| 2002/0037736 A1 | 3/2002 | Kawaguchi et al. |
| 2002/0040344 A1 | 4/2002 | Preiser et al. |
| 2002/0054695 A1 | 5/2002 | Bjorn et al. |
| 2002/0073316 A1 | 6/2002 | Collins et al. |
| 2002/0073320 A1 | 6/2002 | Rinkevich et al. |
| 2002/0087894 A1 | 7/2002 | Foley et al. |
| 2002/0112170 A1 | 8/2002 | Foley et al. |
| 2002/0174344 A1 | 11/2002 | Ting |
| 2002/0174348 A1 | 11/2002 | Ting |
| 2002/0190124 A1 * | 12/2002 | Piotrowski ........... G06Q 20/341 235/382 |
| 2003/0021283 A1 | 1/2003 | See et al. |
| 2003/0055792 A1 | 3/2003 | Kinoshita et al. |
| 2003/0065805 A1 | 4/2003 | Barnes et al. |
| 2003/0084300 A1 | 5/2003 | Koike |
| 2003/0087629 A1 | 5/2003 | Juitt et al. |
| 2003/0115142 A1 | 6/2003 | Brickell et al. |
| 2003/0135740 A1 | 7/2003 | Talmor et al. |
| 2003/0152252 A1 | 8/2003 | Kondo et al. |
| 2003/0226036 A1 | 12/2003 | Bivens et al. |
| 2003/0236991 A1 | 12/2003 | Letsinger |
| 2004/0039909 A1 | 2/2004 | Cheng |
| 2004/0101170 A1 | 5/2004 | Tisse et al. |
| 2004/0123153 A1 | 6/2004 | Wright et al. |
| 2005/0021964 A1 | 1/2005 | Bhatnagar et al. |
| 2005/0080716 A1 | 4/2005 | Belyi et al. |
| 2005/0097320 A1 | 5/2005 | Golan et al. |
| 2005/0100166 A1 | 5/2005 | Smetters et al. |
| 2005/0125295 A1 | 6/2005 | Tidwell et al. |
| 2005/0160052 A1 | 7/2005 | Schneider et al. |
| 2005/0187883 A1 | 8/2005 | Bishop et al. |
| 2005/0223217 A1 | 10/2005 | Howard et al. |
| 2005/0223236 A1 | 10/2005 | Yamada et al. |
| 2005/0278253 A1 | 12/2005 | Meek et al. |
| 2006/0026671 A1 | 2/2006 | Potter et al. |
| 2006/0029062 A1 | 2/2006 | Rao et al. |
| 2006/0101136 A1 | 5/2006 | Akashika et al. |
| 2006/0156385 A1 | 7/2006 | Chiviendacz et al. |
| 2006/0161435 A1 | 7/2006 | Atef et al. |
| 2006/0161672 A1 | 7/2006 | Jolley et al. |
| 2006/0177061 A1 | 8/2006 | Orsini et al. |
| 2006/0213978 A1 | 9/2006 | Geller et al. |
| 2006/0282670 A1 | 12/2006 | Karchov |
| 2007/0005988 A1 | 1/2007 | Zhang et al. |
| 2007/0077915 A1 | 4/2007 | Black et al. |
| 2007/0088950 A1 | 4/2007 | Wheeler et al. |
| 2007/0094165 A1 | 4/2007 | Gyorfi et al. |
| 2007/0100756 A1 | 5/2007 | Varma |
| 2007/0106895 A1 | 5/2007 | Huang et al. |
| 2007/0107048 A1 | 5/2007 | Halls et al. |
| 2007/0118883 A1 | 5/2007 | Potter et al. |
| 2007/0165625 A1 | 7/2007 | Eisner et al. |
| 2007/0168677 A1 | 7/2007 | Kudo et al. |
| 2007/0169182 A1 | 7/2007 | Wolfond et al. |
| 2007/0198435 A1 | 8/2007 | Siegal et al. |
| 2007/0234417 A1 | 10/2007 | Blakley, III et al. |
| 2007/0239980 A1 | 10/2007 | Funayama |
| 2007/0278291 A1 | 12/2007 | Rans et al. |
| 2007/0286130 A1 | 12/2007 | Shao et al. |
| 2008/0005562 A1 | 1/2008 | Sather et al. |
| 2008/0025234 A1 | 1/2008 | Zhu et al. |
| 2008/0028453 A1 | 1/2008 | Nguyen et al. |
| 2008/0034207 A1 | 2/2008 | Cam-Winget et al. |
| 2008/0046334 A1 | 2/2008 | Lee et al. |
| 2008/0046984 A1 | 2/2008 | Bohmer et al. |
| 2008/0049983 A1 | 2/2008 | Miller et al. |
| 2008/0072054 A1 | 3/2008 | Choi |
| 2008/0086759 A1 | 4/2008 | Colson |
| 2008/0134311 A1 | 6/2008 | Medvinsky et al. |
| 2008/0141339 A1 | 6/2008 | Gomez et al. |
| 2008/0172725 A1 | 7/2008 | Fujii et al. |
| 2008/0184351 A1 | 7/2008 | Gephart et al. |
| 2008/0189212 A1 | 8/2008 | Kulakowski et al. |
| 2008/0209545 A1 | 8/2008 | Asano |
| 2008/0232565 A1 | 9/2008 | Kutt et al. |
| 2008/0235801 A1 | 9/2008 | Soderberg et al. |
| 2008/0271150 A1 | 10/2008 | Boerger et al. |
| 2008/0289019 A1 | 11/2008 | Lam |
| 2008/0289020 A1 | 11/2008 | Cameron et al. |

(56) References Cited

U.S. PATENT DOCUMENTS

| | | |
|---|---|---|
| 2008/0313719 A1 | 12/2008 | Kaliski, Jr. et al. |
| 2008/0320308 A1 | 12/2008 | Kostiainen et al. |
| 2009/0049510 A1 | 2/2009 | Zhang et al. |
| 2009/0055322 A1 | 2/2009 | Bykov et al. |
| 2009/0064292 A1 | 3/2009 | Carter et al. |
| 2009/0083850 A1 | 3/2009 | Fadell et al. |
| 2009/0089870 A1 | 4/2009 | Wahl |
| 2009/0100269 A1 | 4/2009 | Naccache |
| 2009/0116651 A1 | 5/2009 | Liang et al. |
| 2009/0119221 A1 | 5/2009 | Weston et al. |
| 2009/0133113 A1 | 5/2009 | Schneider |
| 2009/0138724 A1 | 5/2009 | Chiou et al. |
| 2009/0138727 A1 | 5/2009 | Campello |
| 2009/0158425 A1 | 6/2009 | Chan et al. |
| 2009/0164797 A1 | 6/2009 | Kramer et al. |
| 2009/0183003 A1 | 7/2009 | Haverinen |
| 2009/0187988 A1 | 7/2009 | Hulten et al. |
| 2009/0193508 A1 | 7/2009 | Brenneman et al. |
| 2009/0196418 A1 | 8/2009 | Tkacik et al. |
| 2009/0199264 A1 | 8/2009 | Lang |
| 2009/0204964 A1 | 8/2009 | Foley et al. |
| 2009/0235339 A1 | 9/2009 | Mennes et al. |
| 2009/0271618 A1 | 10/2009 | Camenisch et al. |
| 2009/0271635 A1 | 10/2009 | Liu et al. |
| 2009/0300714 A1 | 12/2009 | Ahn |
| 2009/0300720 A1 | 12/2009 | Guo et al. |
| 2009/0307139 A1 | 12/2009 | Mardikar et al. |
| 2009/0327131 A1 | 12/2009 | Beenau et al. |
| 2009/0328197 A1 | 12/2009 | Newell et al. |
| 2010/0010932 A1 | 1/2010 | Law et al. |
| 2010/0023454 A1 | 1/2010 | Exton et al. |
| 2010/0029300 A1 | 2/2010 | Chen |
| 2010/0042848 A1 | 2/2010 | Rosener |
| 2010/0062744 A1 | 3/2010 | Ibrahim |
| 2010/0070424 A1 | 3/2010 | Monk |
| 2010/0082484 A1 | 4/2010 | Erhart et al. |
| 2010/0083000 A1 | 4/2010 | Kesanupalli |
| 2010/0094681 A1 | 4/2010 | Almen et al. |
| 2010/0105427 A1 | 4/2010 | Gupta |
| 2010/0107222 A1 | 4/2010 | Glasser |
| 2010/0114776 A1 | 5/2010 | Weller et al. |
| 2010/0121855 A1 | 5/2010 | Dalia et al. |
| 2010/0169650 A1 | 7/2010 | Brickell et al. |
| 2010/0175116 A1 | 7/2010 | Gum |
| 2010/0186072 A1 | 7/2010 | Kumar |
| 2010/0191612 A1 | 7/2010 | Raleigh |
| 2010/0192209 A1 | 7/2010 | Steeves et al. |
| 2010/0205658 A1 | 8/2010 | Griffin |
| 2010/0223663 A1 | 9/2010 | Morimoto et al. |
| 2010/0242088 A1 | 9/2010 | Thomas |
| 2010/0266128 A1 | 10/2010 | Asokan et al. |
| 2010/0287369 A1 | 11/2010 | Monden |
| 2010/0299738 A1 | 11/2010 | Wahl |
| 2010/0325427 A1 | 12/2010 | Ekberg et al. |
| 2010/0325664 A1 | 12/2010 | Kang |
| 2010/0325684 A1 | 12/2010 | Grebenik et al. |
| 2010/0325711 A1 | 12/2010 | Etchegoyen |
| 2011/0004918 A1 | 1/2011 | Chow et al. |
| 2011/0004933 A1 | 1/2011 | Dickinson et al. |
| 2011/0022835 A1 | 1/2011 | Schibuk |
| 2011/0047608 A1 | 2/2011 | Levenberg |
| 2011/0071841 A1 | 3/2011 | Fomenko et al. |
| 2011/0078443 A1 | 3/2011 | Greenstein et al. |
| 2011/0082801 A1 | 4/2011 | Baghdasaryan et al. |
| 2011/0083016 A1* | 4/2011 | Kesanupalli ............ G06Q 20/10 713/180 |
| 2011/0093942 A1 | 4/2011 | Koster et al. |
| 2011/0099361 A1 | 4/2011 | Shah et al. |
| 2011/0107087 A1 | 5/2011 | Lee et al. |
| 2011/0138450 A1* | 6/2011 | Kesanupalli ............ G06Q 20/10 726/7 |
| 2011/0157346 A1 | 6/2011 | Zyzdryn et al. |
| 2011/0167154 A1 | 7/2011 | Bush et al. |
| 2011/0167472 A1 | 7/2011 | Evans et al. |
| 2011/0191200 A1 | 8/2011 | Bayer et al. |
| 2011/0197267 A1 | 8/2011 | Gravel et al. |
| 2011/0219427 A1 | 9/2011 | Hito et al. |
| 2011/0225431 A1 | 9/2011 | Stufflebeam, Jr. et al. |
| 2011/0228330 A1 | 9/2011 | Nogawa |
| 2011/0231911 A1 | 9/2011 | White et al. |
| 2011/0246766 A1 | 10/2011 | Orsini et al. |
| 2011/0265159 A1 | 10/2011 | Ronda et al. |
| 2011/0279228 A1* | 11/2011 | Kumar ..................... G09B 7/00 340/5.83 |
| 2011/0280402 A1 | 11/2011 | Ibrahim et al. |
| 2011/0296518 A1 | 12/2011 | Faynberg et al. |
| 2011/0307706 A1 | 12/2011 | Fielder |
| 2011/0307949 A1 | 12/2011 | Ronda et al. |
| 2011/0313872 A1 | 12/2011 | Carter et al. |
| 2011/0314549 A1 | 12/2011 | Song et al. |
| 2011/0320823 A1 | 12/2011 | Saroiu et al. |
| 2012/0018506 A1 | 1/2012 | Hammad et al. |
| 2012/0023568 A1 | 1/2012 | Cha et al. |
| 2012/0046012 A1 | 2/2012 | Forutanpour et al. |
| 2012/0047555 A1 | 2/2012 | Xiao et al. |
| 2012/0066757 A1 | 3/2012 | Vysogorets et al. |
| 2012/0075062 A1 | 3/2012 | Osman et al. |
| 2012/0084566 A1 | 4/2012 | Chin et al. |
| 2012/0102553 A1 | 4/2012 | Hsueh et al. |
| 2012/0124639 A1 | 5/2012 | Shaikh et al. |
| 2012/0124651 A1 | 5/2012 | Ganesan et al. |
| 2012/0144461 A1 | 6/2012 | Rathbun |
| 2012/0159577 A1 | 6/2012 | Belinkiy et al. |
| 2012/0191979 A1 | 7/2012 | Feldbau |
| 2012/0203906 A1 | 8/2012 | Jaudon et al. |
| 2012/0204032 A1 | 8/2012 | Wilkins et al. |
| 2012/0210135 A1 | 8/2012 | Panchapakesan et al. |
| 2012/0249298 A1 | 10/2012 | Sovio et al. |
| 2012/0272056 A1 | 10/2012 | Ganesan |
| 2012/0278873 A1 | 11/2012 | Calero et al. |
| 2012/0291114 A1 | 11/2012 | Poliashenko et al. |
| 2012/0313746 A1 | 12/2012 | Rahman et al. |
| 2012/0317297 A1 | 12/2012 | Bailey |
| 2013/0013931 A1 | 1/2013 | O'Hare et al. |
| 2013/0042115 A1 | 2/2013 | Sweet et al. |
| 2013/0042327 A1 | 2/2013 | Chow |
| 2013/0046976 A1 | 2/2013 | Rosati et al. |
| 2013/0046991 A1 | 2/2013 | Lu et al. |
| 2013/0047200 A1 | 2/2013 | Radhakrishnan et al. |
| 2013/0054336 A1 | 2/2013 | Graylin |
| 2013/0054967 A1 | 2/2013 | Davoust et al. |
| 2013/0055370 A1 | 2/2013 | Goldberg et al. |
| 2013/0061055 A1 | 3/2013 | Schibuk |
| 2013/0067546 A1 | 3/2013 | Thavasi et al. |
| 2013/0073859 A1 | 3/2013 | Carlson et al. |
| 2013/0086669 A1 | 4/2013 | Sondhi et al. |
| 2013/0090939 A1 | 4/2013 | Robinson et al. |
| 2013/0097682 A1 | 4/2013 | Zeljkovic et al. |
| 2013/0104187 A1 | 4/2013 | Weidner |
| 2013/0104190 A1 | 4/2013 | Simske et al. |
| 2013/0119130 A1 | 5/2013 | Braams |
| 2013/0124285 A1 | 5/2013 | Pravetz et al. |
| 2013/0124422 A1 | 5/2013 | Hubert et al. |
| 2013/0125197 A1 | 5/2013 | Pravetz et al. |
| 2013/0125222 A1 | 5/2013 | Pravetz et al. |
| 2013/0133049 A1 | 5/2013 | Peirce |
| 2013/0133054 A1 | 5/2013 | Davis et al. |
| 2013/0144785 A1 | 6/2013 | Karpenko et al. |
| 2013/0159413 A1 | 6/2013 | Davis et al. |
| 2013/0159716 A1 | 6/2013 | Buck et al. |
| 2013/0160083 A1 | 6/2013 | Schrix et al. |
| 2013/0160100 A1 | 6/2013 | Langley |
| 2013/0167196 A1 | 6/2013 | Spencer et al. |
| 2013/0191884 A1 | 7/2013 | Leicher et al. |
| 2013/0212637 A1 | 8/2013 | Guccione et al. |
| 2013/0219456 A1 | 8/2013 | Sharma et al. |
| 2013/0227646 A1 | 8/2013 | Haggerty et al. |
| 2013/0239173 A1 | 9/2013 | Dispensa |
| 2013/0246272 A1 | 9/2013 | Kirsch et al. |
| 2013/0262305 A1 | 10/2013 | Jones et al. |
| 2013/0282589 A1 | 10/2013 | Shoup et al. |
| 2013/0308778 A1 | 11/2013 | Fosmark et al. |
| 2013/0318343 A1 | 11/2013 | Bjarnason et al. |
| 2013/0326215 A1 | 12/2013 | Leggette et al. |

(56) References Cited

U.S. PATENT DOCUMENTS

| | | |
|---|---|---|
| 2013/0337777 A1 | 12/2013 | Deutsch et al. |
| 2013/0346176 A1 | 12/2013 | Alolabi et al. |
| 2014/0002238 A1 | 1/2014 | Taveau et al. |
| 2014/0007215 A1 | 1/2014 | Romano et al. |
| 2014/0013422 A1 | 1/2014 | Janus et al. |
| 2014/0033271 A1 | 1/2014 | Barton et al. |
| 2014/0040987 A1 | 2/2014 | Haugsnes |
| 2014/0044265 A1 | 2/2014 | Kocher et al. |
| 2014/0047510 A1 | 2/2014 | Belton et al. |
| 2014/0066015 A1 | 3/2014 | Aissi |
| 2014/0068746 A1 | 3/2014 | Gonzalez et al. |
| 2014/0075516 A1 | 3/2014 | Chermside |
| 2014/0089243 A1 | 3/2014 | Oppenheimer |
| 2014/0096182 A1 | 4/2014 | Smith |
| 2014/0101439 A1 | 4/2014 | Pettigrew et al. |
| 2014/0109174 A1 | 4/2014 | Barton et al. |
| 2014/0114857 A1 | 4/2014 | Griggs et al. |
| 2014/0115702 A1 | 4/2014 | Li et al. |
| 2014/0130127 A1 | 5/2014 | Toole et al. |
| 2014/0137191 A1 | 5/2014 | Goldsmith et al. |
| 2014/0164776 A1 | 6/2014 | Hook et al. |
| 2014/0173754 A1 | 6/2014 | Barbir |
| 2014/0188770 A1 | 7/2014 | Agrafioti et al. |
| 2014/0189350 A1 | 7/2014 | Baghdasaryan et al. |
| 2014/0189360 A1 | 7/2014 | Baghdasaryan et al. |
| 2014/0189779 A1 | 7/2014 | Baghdasaryan et al. |
| 2014/0189791 A1 | 7/2014 | Lindemann et al. |
| 2014/0189807 A1 | 7/2014 | Cahill et al. |
| 2014/0189808 A1 | 7/2014 | Mahaffey et al. |
| 2014/0189828 A1 | 7/2014 | Baghdasaryan et al. |
| 2014/0189835 A1 | 7/2014 | Umerley |
| 2014/0201809 A1 | 7/2014 | Choyi et al. |
| 2014/0230032 A1 | 8/2014 | Duncan |
| 2014/0245391 A1 | 8/2014 | Adenuga |
| 2014/0250523 A1 | 9/2014 | Savvides et al. |
| 2014/0258125 A1 | 9/2014 | Gerber et al. |
| 2014/0258711 A1 | 9/2014 | Brannon |
| 2014/0279516 A1 | 9/2014 | Rellas et al. |
| 2014/0282868 A1 | 9/2014 | Sheller et al. |
| 2014/0282945 A1 | 9/2014 | Smith et al. |
| 2014/0282965 A1 | 9/2014 | Sambamurthy et al. |
| 2014/0289116 A1 | 9/2014 | Polivanyi et al. |
| 2014/0289117 A1 | 9/2014 | Baghdasaryan |
| 2014/0289820 A1 | 9/2014 | Lindemann |
| 2014/0289833 A1 | 9/2014 | Briceno et al. |
| 2014/0289834 A1 | 9/2014 | Lindemann |
| 2014/0298419 A1 | 10/2014 | Boubez et al. |
| 2014/0304505 A1 | 10/2014 | Dawson |
| 2014/0333413 A1 | 11/2014 | Kursun et al. |
| 2014/0335824 A1 | 11/2014 | Abraham |
| 2014/0337948 A1 | 11/2014 | Hoyos |
| 2015/0019220 A1 | 1/2015 | Talhami et al. |
| 2015/0046340 A1 | 2/2015 | Dimmick |
| 2015/0058931 A1 | 2/2015 | Miu et al. |
| 2015/0095999 A1 | 4/2015 | Toth et al. |
| 2015/0096002 A1 | 4/2015 | Shuart et al. |
| 2015/0121068 A1 | 4/2015 | Lindemann et al. |
| 2015/0134330 A1 | 5/2015 | Baldwin et al. |
| 2015/0142628 A1 | 5/2015 | Suplee et al. |
| 2015/0180869 A1 | 6/2015 | Verma |
| 2015/0244525 A1 | 8/2015 | McCusker et al. |
| 2015/0244696 A1 | 8/2015 | Ma |
| 2015/0269050 A1 | 9/2015 | Filimonov et al. |
| 2015/0326529 A1 | 11/2015 | Morita |
| 2015/0373039 A1 | 12/2015 | Wang |
| 2015/0381580 A1 | 12/2015 | Graham, III et al. |
| 2016/0036588 A1 | 2/2016 | Thackston |
| 2016/0072787 A1 | 3/2016 | Balabine et al. |
| 2016/0078869 A1 | 3/2016 | Syrdal et al. |
| 2016/0087952 A1 | 3/2016 | Tartz et al. |
| 2016/0087957 A1 | 3/2016 | Shah et al. |
| 2016/0188958 A1 | 6/2016 | Martin |
| 2016/0292687 A1 | 10/2016 | Kruglick et al. |
| 2017/0004487 A1 | 1/2017 | Hagen et al. |
| 2017/0011406 A1 | 1/2017 | Tunnell et al. |
| 2017/0048070 A1 | 2/2017 | Gulati et al. |
| 2017/0109751 A1 | 4/2017 | Dunkelberger et al. |
| 2017/0195121 A1 | 7/2017 | Frei et al. |
| 2017/0221068 A1 | 8/2017 | Krauss et al. |
| 2017/0317833 A1 | 11/2017 | Smith et al. |
| 2017/0330174 A1 | 11/2017 | Demarinis et al. |
| 2017/0330180 A1 | 11/2017 | Song et al. |
| 2017/0331632 A1 | 11/2017 | Leoutsarakos et al. |
| 2018/0039990 A1 | 2/2018 | Lindemann et al. |
| 2018/0191501 A1 | 7/2018 | Lindemann |
| 2018/0191695 A1 | 7/2018 | Lindemann |

FOREIGN PATENT DOCUMENTS

| | | |
|---|---|---|
| CN | 101495956 A | 7/2009 |
| CN | 102713922 A | 10/2012 |
| CN | 102763111 A | 10/2012 |
| CN | 103999401 A | 8/2014 |
| EP | 2357754 A1 | 8/2011 |
| JP | 2002152189 A | 5/2002 |
| JP | 2003143136 A | 5/2003 |
| JP | 2004348308 A | 12/2004 |
| JP | 2007220075 A | 8/2007 |
| JP | 2008065844 A | 3/2008 |
| JP | 2013016070 A | 1/2013 |
| TW | 200701120 A | 1/2007 |
| TW | 201121280 A | 6/2011 |
| WO | 03017159 A1 | 2/2003 |
| WO | 2005003985 A1 | 1/2005 |
| WO | 2007023756 A1 | 3/2007 |
| WO | 2009158530 A2 | 12/2009 |
| WO | 2010067433 A1 | 6/2010 |
| WO | 2013082190 A1 | 6/2013 |
| WO | 2014105994 A2 | 7/2014 |
| WO | 2015130734 A1 | 9/2015 |

OTHER PUBLICATIONS

Advisory Action from U.S. Appl. No. 13/730,791 dated Jan. 23, 2015, 4 pages.

Akhtar Z., et al., "Spoof Attacks on Multimodal Biometric Systems", International Conference on Information and Network Technology, 2011, vol. 4, pp. 46-51.

Bao, W., et al., "A liveness detection method for face recognition based on optical flow field", 2009, pp. 233-236, http://ieeexplore.ieee.org/stamp/stamp.jsp?tp=&arnumber=5054589&isnumber=5054562.

Barker E., et al., "Recommendation for key management Part 3: Application—Specific Key Management Guidance", NIST Special Publication 800-57, 2009, pp. 1-103.

BehavioSec, "Measuring FAR/FRR/EER in Continuous Authentication," Stockholm, Sweden (2009), 8 pages.

Brickell, E., et al., Intel Corporation; Jan Camenish, IBM Research; Liqun Chen, HP Laboratories. "Direct Anonymous Attestation". Feb. 11, 2004, pp. 1-28 [online]. Retrieved from the Internet URL:https://eprint.iacr.org/2004/205.pdf.

Chakka M., et al., "Competition on Counter Measures to 2-D Facial Spoofing Attacks". 6 pages .2011. http://www.csis.pace.edu/-ctappert/dps/IJCB2011/papers/130.pdf. 978-1-4577-1359-0/11.

Chen L., et al., "Flexible and scalable digital signatures in TPM 2.0." Proceedings of the 2013 ACM SIGSAC conference on Computer & communications security. ACM, 2013, 12 pages.

Chetty G. School of ISE University of Canberra Australia. "Multilevel liveness verification for face-voice biometric authentication". BYSM—2006 Symposium. Baltimore: BYSM—Symposium 9 pages. Sep. 19, 2006. http://www.biometrics.org/bc2006/presentations/Tues_Sep_19/BSYM/19_Chetty_research.pdf.

Communication pursuant to Rules 161(2) and 162 EPC for EP Application No. 15826364.0, dated Mar. 7, 2017, 2 pages.

Crazy Egg Heatmap Shows Where People Click on Your Website, 2012, 3 pages, www.michaelhartzell.com/Blog/bid/92970/Crazy-Egg-Heatmap-shows-where-people-click-on-your-website).

Dawei Zhang; Peng Hu, "Trusted e-commerce user agent based on USB Key", Proceedings of the International MultiConference of

(56) References Cited

OTHER PUBLICATIONS

Engineers and Computer Scientists 2008 vol. I, IMECS 2008, Mar. 19-21, 2008, Hong Kong, 7 pages.
Delac K. et al., Eds., "Image Compression in Face Recognition a Literature Survey," InTech, Jun. 1, 2008, ISBN 978-953-7619-34-3, Uploaded as individual Chapters 1-15, downloaded from https://www.intechopen.com/books/recent_advances_in_face_recognition/image_compression_in_face_recognition_-_a_literature_survey, 15 pages.
Doherty, et al., Internet Engineering Task Force (IETF), "Dynamic Symmetric Key Provisioning Protocol (DSKPP)", Dec. 2010, 105 pages.
Extended European Search Report for Application No. 13867269, dated Nov. 4, 2016, 10 pages.
Extended European Search Report for Application No. 14803988.6, dated Dec. 23, 2016, 10 pages.
Extended European Search Report for Application No. 15786487.7, dated Oct. 23, 2017, 8 pages.
Extended European Search Report for Application No. 15786796.1, dated Nov. 3, 2017, 9 pages.
Extended European Search Report for Application No. 15826660.1, dated Nov. 16, 2017, 9 pages.
Extended European Search Report for Application No. 15827334.2, dated Nov. 17, 2017, 8 pages.
Extended European Search Report from European Patent Application No. 14770682.4, dated Jan. 17, 2017, 14 pages.
Final Office Action from U.S. Appl. No. 13/730,761 dated Jan. 15, 2015, 31 pages.
Final Office Action from U.S. Appl. No. 13/730,761 dated Jul. 8, 2014, 36 pages.
Final Office Action from U.S. Appl. No. 13/730,776 dated Nov. 3, 2014, 20 pages.
Final Office Action from U.S. Appl. No. 13/730,780 dated Jan. 27, 2015, 30 pages.
Final Office Action from U.S. Appl. No. 13/730,780 dated May 12, 2014, 34 pages.
Final Office Action from U.S. Appl. No. 13/730,791 dated Nov. 13, 2014, 22 pages.
Final Office Action from U.S. Appl. No. 13/730,795 dated Aug. 14, 2014, 20 pages.
Final Office Action from U.S. Appl. No. 14/066,273 dated Feb. 11, 2016, 29 pages.
Final Office Action from U.S. Appl. No. 14/066,273, dated Jan. 10, 2017, 24 pages.
Final Office Action from U.S. Appl. No. 14/066,273, dated Sep. 8, 2017, 30 pages.
Final Office Action from U.S. Appl. No. 14/066,384 dated Aug. 20, 2015, 23 pages.
Final Office Action from U.S. Appl. No. 14/145,466, dated Apr. 13, 2017, 61 pages.
Final Office Action from U.S. Appl. No. 14/218,504, dated Sep. 12, 2017, 83 pages.
Final Office Action from U.S. Appl. No. 14/218,551 dated Sep. 9, 2015, 15 pages.
Final Office Action from U.S. Appl. No. 14/218,551 dated Sep. 16, 2016, 11 pages.
Final Office Action from U.S. Appl. No. 14/218,575 dated Aug. 7, 2015, 19 pages.
Final Office Action from U.S. Appl. No. 14/218,575 dated Jul. 7, 2016, 29 pages.
Final Office Action from U.S. Appl. No. 14/218,575, dated Jul. 31, 2017, 42 pages.
Final Office Action from U.S. Appl. No. 14/218,611, dated Jan. 27, 2017, 14 pages.
Final Office Action from U.S. Appl. No. 14/218,646 dated Aug. 11, 2016, 25 pages.
Final Office Action from U.S. Appl. No. 14/218,646, dated Sep. 27, 2017, 81 pages.
Final Office Action from U.S. Appl. No. 14/218,677 dated Sep. 28, 2017, 16 pages.
Final Office Action from U.S. Appl. No. 14/218,692, dated Feb. 28, 2017, 27 pages.
Final Office Action from U.S. Appl. No. 14/218,692 dated Mar. 2, 2016, 24 pages.
Final Office Action from U.S. Appl. No. 14/218,743, dated Mar. 3, 2017, 67 pages.
Final Office Action from U.S. Appl. No. 14/268,563, dated Nov. 3, 2017, 46 pages.
Final Office Action from U.S. Appl. No. 14/268,619 dated Dec. 14, 2015, 10 pages.
Final Office Action from U.S. Appl. No. 14/268,733 dated Jan. 15, 2016, 14 pages.
Non-Final Office Action from U.S. Appl. No. 13/730,776 dated Jul. 15, 2014, 16 pages.
Non-Final Office Action from U.S. Appl. No. 13/730,780 dated Aug. 4, 2014, 30 pages.
Non-Final Office Action from U.S. Appl. No. 13/730,780 dated Mar. 12, 2014, 22 pages.
Non-Final Office Action from U.S. Appl. No. 13/730,791 dated Jun. 27, 2014, 17 pages.
Non-Final Office Action from U.S. Appl. No. 13/730,795 dated Jan. 5, 2015, 19 pages.
Non-Final Office Action from U.S. Appl. No. 13/730,795 dated Jun. 11, 2014, 14 pages.
Non-Final Office Action from U.S. Appl. No. 14/066,273 dated Jun. 16, 2016, 43 pages.
Non-Final Office Action from U.S. Appl. No. 14/066,273 dated May 8, 2015, 31 pages.
Non-Final Office Action from U.S. Appl. No. 14/066,273, dated May 18, 2017, 46 pages.
Non-Final Office Action from U.S. Appl. No. 14/066,384 dated Jan. 7, 2015, 24 pages.
Non-Final Office Action from U.S. Appl. No. 14/066,384 dated Mar. 17, 2016, 40 pages.
Non-Final Office Action from U.S. Appl. No. 14/145,439 dated Feb. 12, 2015, 18 pages.
Non-Final Office Action from U.S. Appl. No. 14/145,466 dated Sep. 9, 2016, 13 pages.
Non-Final Office Action from U.S. Appl. No. 14/145,533 dated Jan. 26, 2015, 13 pages.
Non-Final Office Action from U.S. Appl. No. 14/145,607 dated Mar. 20, 2015, 22 pages.
Non-Final Office Action from U.S. Appl. No. 14/218,504, dated Feb. 27, 2017, 12 pages.
Non-Final Office Action from U.S. Appl. No. 14/218,551 dated Apr. 23, 2015, 9 pages.
Non-Final Office Action from U.S. Appl. No. 14/218,551 dated Jan. 21, 2016, 11 pages.
Non-Final Office Action from U.S. Appl. No. 14/218,551 dated May 12, 2016, 11 pages.
Non-Final Office Action from U.S. Appl. No. 14/218,575 dated Feb. 10, 2015, 17 pages.
Non-Final Office Action from U.S. Appl. No. 14/218,575 dated Jan. 29, 2016, 25 pages.
Non-Final Office Action from U.S. Appl. No. 14/218,575, dated May 4, 2017, 88 pages.
Non-Final Office Action from U.S. Appl. No. 14/218,611 dated Jun. 16, 2016, 13 pages.
Non-Final Office Action from U.S. Appl. No. 14/218,611, dated Sep. 19, 2017, 76 pages.
Non-Final Office Action from U.S. Appl. No. 14/218,646 dated Mar. 10, 2016, 23 pages.
Non-Final Office Action from U.S. Appl. No. 14/218,646, dated Mar. 27, 2017, 24 pages.
Non-Final Office Action from U.S. Appl. No. 14/218,677 dated Aug. 2, 2016, 15 pages.
Non-Final Office Action from U.S. Appl. No. 14/218,677, dated Feb. 10, 2017, 18 pages.
Non-Final Office Action from U.S. Appl. No. 14/218,692 dated Nov. 4, 2015, 16 pages.
Non-Final Office Action from U.S. Appl. No. 14/218,692 dated Oct. 25, 2016, 33 pages.

(56) References Cited

OTHER PUBLICATIONS

Non-Final Office Action from U.S. Appl. No. 14/218,692, dated Sep. 19, 2017, 37 pages.
Non-Final Office Action from U.S. Appl. No. 14/218,743, dated Aug. 2, 2017, 24 pages.
Non-Final Office Action from U.S. Appl. No. 14/218,743 dated Aug. 19, 2016, 11 pages.
Non-Final Office Action from U.S. Appl. No. 14/218,743 dated Jan. 21, 2016, 12 pages.
Non-final Office Action from U.S. Appl. No. 14/268,563, dated Apr. 21, 2017, 83 pages.
Non-Final Office Action from U.S. Appl. No. 14/268,619 dated Aug. 24, 2015, 17 pages.
Non-Final Office Action from U.S. Appl. No. 14/268,619 dated Mar. 21, 2016, 7 pages.
Non-Final Office Action from U.S. Appl. No. 14/268,733 dated Jul. 16, 2015, 13 pages.
Non-Final Office Action from U.S. Appl. No. 14/448,641 dated Nov. 9, 2015, 21 pages.
Non-Final Office Action from U.S. Appl. No. 14/448,747 dated Aug. 19, 2016, 21 pages.
Non-Final Office Action from U.S. Appl. No. 14/448,814, dated Apr. 5, 2017, 57 pages.
Non-Final Office Action from U.S. Appl. No. 14/448,814 dated Aug. 4, 2015, 13 pages.
Non-Final Office Action from U.S. Appl. No. 14/448,868 dated Dec. 31, 2015, 12 pages.
Non-Final Office Action from U.S. Appl. No. 14/487,992 dated Dec. 3, 2015, 15 pages.
Non-Final Office Action from U.S. Appl. No. 14/859,328, dated Jul. 14, 2017, 29 pages.
Non-Final Office Action from U.S. Appl. No. 14/859,328, dated Sep. 15, 2016, 39 pages.
Non-Final Office Action from U.S. Appl. No. 15/396,452 dated Oct. 13, 2017, 76 pages.
Notice of Allowance from U.S. Appl. No. 14/487,992 dated May 12, 2016, 11 pages.
Notice of Allowance from U.S. Appl. No. 13/730,761 dated Jun. 10, 2015, 15 pages.
Notice of Allowance from U.S. Appl. No. 13/730,761 dated Sep. 28, 2015, 5 pages.
Notice of Allowance from U.S. Appl. No. 13/730,776 dated Feb. 13, 2015, 16 pages.
Notice of Allowance from U.S. Appl. No. 13/730,776 dated Mar. 24, 2015, 3 pages.
Notice of Allowance from U.S. Appl. No. 13/730,780 dated Aug. 13, 2015, 13 pages.
Notice of Allowance from U.S. Appl. No. 13/730,791 dated Mar. 10, 2015, 17 pages.
Notice of Allowance from U.S. Appl. No. 13/730,795 dated Jan. 14, 2016, 11 pages.
Notice of Allowance from U.S. Appl. No. 13/730,795 dated May 15, 2015, 8 pages.
Notice of Allowance from U.S. Appl. No. 13/730,795 dated Sep. 17, 2015, 11 pages.
Notice of Allowance from U.S. Appl. No. 14/066,384 dated Sep. 27, 2016, 19 pages.
Notice of Allowance from U.S. Appl. No. 14/066,384, dated Dec. 1, 2017, 23 pages.
Notice of Allowance from U.S. Appl. No. 14/066,384, dated Jul. 26, 2017, 20 pages.
Notice of Allowance from U.S. Appl. No. 14/066,384, dated May 23, 2017, 50 pages.
Notice of Allowance from U.S. Appl. No. 14/145,439 dated Jul. 6, 2015, 6 pages.
Notice of Allowance from U.S. Appl. No. 14/145,439 dated Mar. 14, 2016, 17 pages.
Notice of Allowance from U.S. Appl. No. 14/145,439 dated Oct. 28, 2015, 12 pages.
Notice of Allowance from U.S. Appl. No. 14/145,533 dated Jan. 20, 2016, 12 pages.
Notice of Allowance from U.S. Appl. No. 14/145,533 dated May 11, 2015, 5 pages.
Notice of Allowance from U.S. Appl. No. 14/145,533 dated Sep. 14, 2015, 13 pages.
Notice of Allowance from U.S. Appl. No. 14/145,607 dated Feb. 1, 2016, 28 pages.
Notice of Allowance from U.S. Appl. No. 14/145,607 dated Sep. 2, 2015, 19 pages.
Notice of Allowance from U.S. Appl. 14/218,551, dated Aug. 16, 2017, 24 pages.
Notice of Allowance from U.S. Appl. No. 14/218,551, dated Dec. 13, 2017, 13 pages.
Notice of Allowance from U.S. Appl. No. 14/218,551, dated Feb. 8, 2017, 56 pages.
Notice of Allowance from U.S. Appl. No. 14/218,551, dated Mar. 1, 2017, 7 pages.
Notice of Allowance from U.S. Appl. No. 14/268,619 dated Oct. 3, 2016, 65 pages.
Notice of Allowance from U.S. Appl. No. 14/268,619 dated Jul. 19, 2016, 5 pages.
Notice of Allowance from U.S. Appl. No. 14/268,686 dated Apr. 18, 2016, 16 pages.
Notice of Allowance from U.S. Appl. No. 14/268,686 dated Jul. 8, 2016, 4 pages.
Notice of Allowance from U.S. Appl. No. 14/268,686 dated Mar. 30, 2016, 38 pages.
Notice of Allowance from U.S. Appl. No. 14/268,686 dated Nov. 5, 2015, 23 pages.
Notice of Allowance from U.S. Appl. No. 14/268,733 dated Sep. 23, 2016, 8 pages.
Notice of Allowance from U.S. Appl. No. 14/268,733, dated Jan. 20, 2017, 62 pages.
Notice of Allowance from U.S. Appl. No. 14/448,641 dated Jun. 7, 2016, 13 pages.
Notice of Allowance from U.S. Appl. No. 14/448,697 dated Jan. 14, 2016, 23 pages.
Notice of Allowance from U.S. Appl. No. 14/448,697 dated May 20, 2016, 14 pages.
Notice of Allowance from U.S. Appl. No. 14/448,697 dated Sep. 1, 2016, 3 pages.
Notice of Allowance from U.S. Appl. No. 14/448,697 dated Sep. 15, 2015, 14 pages.
Notice of Allowance from U.S. Appl. No. 14/448,747, dated Jun. 20, 2017, 14 pages.
Notice of Allowance from U.S. Appl. No. 14/448,868, dated Apr. 27, 2017, 62 pages.
Notice of Allowance from U.S. Appl. No. 14/448,868, dated Jun. 26, 2017, 14 pages.
Notice of Allowance from U.S. Appl. No. 14/448,868, dated Mar. 23, 2017, 57 pages.
Notice of Allowance from U.S. Appl. No. 14/448,868, dated Nov. 17, 2017, 15 pages.
Notice of Allowance from U.S. Appl. No. 14/487,992, dated Apr. 12, 2017, 14 pages.
Notice of Allowance from U.S. Appl. No. 14/487,992, dated Dec. 27, 2016, 28 pages.
Notice of Allowance from U.S. Appl. No. 14/487,992, dated Jul. 17, 2017, 8 pages.
Notice of Allowance from U.S. Appl. No. 14/487,992, dated Jun. 14, 2017, 14 pages.
Notice of Allowance from U.S. Appl. No. 14/487,992 dated Sep. 6, 2016, 26 pages.
Notification Concerning Transmittal of International Preliminary Report on Patentability for Application No. PCT/US14/39627, dated Dec. 10, 2015, 8 pages.
Notification of Transmittal of the International Search Report and the Written Opinion from counterpart Patent Cooperation Treaty Application No. PCT/US13/77888, dated Aug. 4, 2014, 10 pages.
Notification of Transmittal of the International Search Report and the Written Opinion from counterpart Patent Cooperation Treaty Application No. PCT/US14/31344, dated Nov. 3, 2014, 16 pages.

(56) References Cited

OTHER PUBLICATIONS

Notification of Transmittal of the International Search Report and the Written Opinion from counterpart Patent Cooperation Treaty Application No. PCT/US14/39627, dated Oct. 16, 2014, 10 pages.
Notification of Transmittal or International Search Report and Written Opinion from PCT/US2015/028927, dated Jul. 30, 2015, 12 pages.
Office Action and Search Report from foreign counterpart Chinese Patent Application No. 201480031042.X, dated Dec. 4, 2017, 20 pages.
Office Action from foreign counterpart Taiwan Patent Application No. 102148853, dated Feb. 17, 2017, 9 pages.
Pan G., et al., "Liveness Detection for Face Recognition" in: Recent Advances in Face Recognition, 2008, pp. 109-124, Vienna : I-Tech, 2008, Ch. 9, ISBN: 978-953-7619-34-3.
Pan G., et al., "Monocular Camera-based Face Liveness Detection by Combining Eyeblink and Scene Context," pp. 215-225, s.l. : Springer Science+Business Media, LLC, Aug. 4, 2010. Retrieved from the Internet: URL: http://www.cs.zju.edu.cn/-gpan/publication/2011-TeleSysliveness.pdf.
Partial Supplementary European Search Report from European Patent Application No. 14770682.4, dated Oct. 14, 2016, 8 pages.
Peng Y., et al., "RASL: Robust Alignment by Sparse and Low-Rank Decomposition for Linearly Correlated Images", IEEE Conference on Computer Vision and Pattern Recognition, 2010, pp. 763-770. Retrieved from the Internet: URL:http://yima.csl.illinois.edu/psfile/RASL CVPR10.pdf.
Phillips P.J., et al., "Biometric Image Processing and Recognition," Chellappa, 1998, Eusipco, 8 pages.
Phillips P.J., et al., "Face Recognition Vendor Test 2002: Evaluation Report," s.l. : NISTIR 6965, 2002, 56 pages. Retrieved from the Internet: URL: http://www.facerec.org/vendors/FRVT2002_Evaluation_Report.pdf.
Phillips P.J., et al., "FRVT 2006 and ICE 2006 Large-Scale Results", NIST IR 7408, Gaithersburg, NIST, 2006, Mar. 29, 2007, pp. 1-55.
Pinto A., et al., "Video-Based Face Spoofing Detection through Visual Rhythm Analysis," Los Alamitos : IEEE Computer Society Conference Publishing Services, 2012, Conference on Graphics, Patterns and Images, 8 pages. (SIBGRAPI). Retrieved from the Internet: URL: http://sibgrapi.sid.inpe.br/rep/sid.inpe.br/sibgrapi/2012/07.13.21.16?mirror=sid.inpe.br/ banon/2001/03.30.15.38.24&metadatarepository=sid.inpe.br/sibgrapi/2012/07.13.21.1 6.53.
Quinn G.W., et al., "Performance of Face Recognition Algorithms on Compressed Images", NIST Inter Agency Report 7830, NIST, Dec. 4, 2011, 35 pages.
Ratha N.K., et al., "An Analysis of Minutiae Matching Strength," Audio- and Video-Based Biometric Person Authentication, Springer Berlin Heidelberg, 2001, 7 pages.
Ratha, N.K., et al., "Enhancing Security and Privacy in Biometrics-Based Authentication Systems," IBM Systems Journal, 2001, vol. 40 (3), pp. 614-634.
Requirement for Restriction/Election from U.S. Appl. No. 14/218,504 dated Aug. 16, 2016, 11 pages.
RFC 2560: Myers M., et al., "The Online Certificate Status Protocol, OCSP," Network working group, Jun. 1999, RFC 2560, 22 pages.
Roberts C., "Biometric Attack Vectors and Defences," Sep. 2006, 25 pages. Retrieved from the Internet: URL: http://otago.ourarchive.ac.nz/bitstream/handle/10523/1243/BiometricAttackVectors.pdf.
Rocha A., et al., "Vision of the Unseen: Current Trends and Challenges in Digital Image and Video Forensics," ACM Computing Surveys, 2010, 47 pages. Retrieved from the Internet: URL: http://www.wjscheirer.com/papers/wjscsur2011forensics.pdf.
Rodrigues R.N., et al., "Robustness of Multimodal Biometric Fusion Methods Against Spoof Attacks," Journal of Visual Language and Computing. 2009. 11 pages, doi:10.1016/j.jvlc.2009.01.010; Retrieved from the Internet: URL: http://cubs.buffalo.edu/govind/papers/visual09.pdf.
Ross A., et al., "Multimodal Biometrics: An Overview," Proceedings of 12th European Signal Processing Conference (EUSIPCO), Sep. 2004, pp. 1221-1224. Retrieved from the Internet: URL: http://www.csee.wvu.edu/-ross/pubs/RossMultimodaiOverview EUSIPC004.pdf.
Schneier B., Biometrics: Uses and Abuses. Aug. 1999. Inside Risks 110 (CACM 42, Aug. 8, 1999), Retrieved from the Internet: URL: http://www.schneier.com/essay-019.pdf, 3 pages.
Schuckers, "Spoofing and Anti-Spoofing Measures," Information Security Technical Report, 2002, vol. 2002, pp. 56-62.
Schwartz et al., "Face Spoofing Detection Through Partial Least Squares and Low-Level Descriptors," International Conference on Biometrics, 2011, vol. 2011, pp. 1-8.
Smiatacz M., et al., Gdansk University of Technology. Liveness Measurements Using Optical Flow for Biometric Person Authentication. Metrology and Measurement Systems. 2012, vol. XIX, 2. pp. 257-268.
Starnberger G., et al., "QR-TAN: Secure Mobile Transaction Authentication," Availability, Reliability and Security, 2009, ARES'09, International Conference on IEEE, Mar. 16, 2009, pp. 578-585.
Supplementary Partial European Search Report for Application No. 13867269, dated Aug. 3, 2016, 7 pages.
T. Weigold et al., "The Zurich Trusted Information Channel—An Efficient Defence against Man-in-the-Middle and Malicious Software Attacks," P. Lipp, A.R. Sadeghi, and K.M. Koch, eds., Proc. Trust Conf. (Trust 2008), LNCS 4968, Springer-Verlag, 2008, pp. 75-91.
Tan et al., "Face Liveness Detection from a Single Image with Sparse Low Rank Bilinear Discriminative Model," European Conference on Computer Vision, 2010, vol. 2010, pp. 1-14.
TechTarget, What is network perimeter? Definition from WhatIs.com downloaded from http://searchnetworking.techtarget.com/definition/network-perimeter on Apr. 14, 2017, 5 pages.
The Extended M2VTS Database, [Online] [Cited: Sep. 29, 2012] downloaded from http://www.ee.surrey.ac.uk/CVSSP/xm2vtsdb/ on Jan. 28, 2015, 1 page.
Transmittal of International Preliminary Report on Patentability for Patent Application No. PCT/US2013/077888 dated Jul. 9, 2015, 7 pages.
Transmittal of International Preliminary Report on Patentability from foreign counterpart PCT Patent Application No. PCT/US2014/031344 dated Oct. 1, 2015, 9 pages.
Tresadern P., et al., "Mobile Biometrics (MoBio): Joint Face and Voice Verification for a Mobile Platform", 2012, 7 pages. Retrieved from the Internet: URL: http://personal.ee.surrey.ac.uk/Personai/Norman.Poh/data/tresadem_PervComp2012draft.pdf.
Tronci R., et al., "Fusion of Multiple Clues for Photo-Attack Detection in Face Recognition Systems," International Joint Conference on Biometrics, 2011. pp. 1-6.
Uludag, Umut, and Anil K. Jain. "Attacks on biometric systems: a case study in fingerprints." Electronic Imaging 2004. International Society for Optics and Photonics, 2004, 12 pages.
Unobtrusive User-Authentication on Mobile Phones using Biometric Gait Recognition, 2010, 6 pages.
Uymatiao M.L.T., et al., "Time-based OTP authentication via secure tunnel (TOAST); A mobile TOTP scheme using TLS seed exchange and encrypted offline keystore," 2014 4th IEEE International Conference on Information Science and Technology, IEEE, Apr. 26, 2014, pp. 225-229.
Validity, OSTP Framework, 24 pages, 2010.
Vassilev, A.T.; du Castel, B.; Ali, A.M., "Personal Brokerage of Web Service Access," Security & Privacy, IEEE, vol. 5, No. 5, pp. 24-31, Sep.-Oct. 2007.
WikiPedia article for Eye Tracking, 15 pages, Last Modified Jun. 21, 2014, en.wikipedia.org/wiki/Eye_tracking.
Willis N., Linux.com. Weekend Project: Take a Tour of Open Source Eye-Tracking Software. [Online] Mar. 2, 2012. [Cited: Nov. 1, 2012.], 4 pages. Retrieved from the Internet: URL: https://www.linux.com/learn/tutorials/550880-weekend-project-take-a-tour-of-opensource-eye-tracking-software.
Wilson R., "How to Trick Google's New Face Unlock on Android 4.1 Jelly Bean," Aug. 6, 2012, 5 pages, [online], [retrieved Aug. 13, 2015]. Retrieved from the Internet:URL: http://printscreenmac.info/how-to-trick-android-jelly-bean-faceunlock/.

(56) References Cited

OTHER PUBLICATIONS

World Wide Web Consortium, W3C Working Draft: Media Capture and Streams, 2013, 36 pages.
Zhang, "Security Verification of Hardware-enabled Attestation Protocols," IEEE, 2012, pp. 47-54.
Zhao W., et al., "Face Recognition: A Literature Survey," ACM Computing Surveys, 2003, vol. 35 (4), pp. 399-458.
Zhou, et al., "Face Recognition from Still Images and Videos". University of Maryland, College Park, MD 20742. Maryland : s.n., Nov. 5, 2004.pp. 1-23, Retrieved from the Internet: http://citeseerx.ist.psu.edu/viewdoc/download?doi=1 0.1.1.77.1312&rep=rep1 &type=pdf.
Final Office Action from U.S. Appl. No. 14/448,747, dated Feb. 13, 2017, 74 pages.
Final Office Action from U.S. Appl. No. 14/448,814 dated Feb. 16, 2016, 14 pages.
Final Office Action from U.S. Appl. No. 14/448,814 dated Jun. 14, 2016, 17 pages.
Final Office Action from U.S. Appl. No. 14/448,814 dated Oct. 6, 2017, 24 pages.
Final Office Action from U.S. Appl. No. 14/448,868 dated Aug. 19, 2016, 11 pages.
Final Office Action from U.S. Appl. No. 14/859,328, dated Mar. 6, 2017, 26 pages.
First Office Action and Search Report from foreign counterpart China Patent Application No. 201380068869.3, dated Sep. 19, 2017, 17 pages.
First Office Action and Search Report from foreign counterpart China Patent Application No. 201480025959.9, dated Jul. 7, 2017, 10 pages.
Grother, P.J., et al., NIST. Report on the Evaluation of 2D Still-Image Face Recognition Algorithms, NIST IR 7709. s.l, NIST, 2011, Jun. 22, 2010, pp. 1-58.
GSM Arena, "Ice Cream Sandwich's Face Unlock duped using a photograph," Nov. 13, 2011, downloaded from http://www.gsmarena.com/ice_cream_sandwichs_face_unlock_duped_using_a_photograph-news-3377.php on Aug. 18, 2015, 2 pages.
Heikkila M., et al., "A Texture-Based Method for Modeling the Background and Detecting Moving Objects", Oulu : IEEE , Jun. 22, 2005, Draft, Retrieved from the Internet: http://www.ee.oulu.fi/mvg/files/pdf/pdf_662.pdf, 16 pages.
Hernandez, T., "But What Does It All Mean? Understanding Eye-Tracking Results (Part 3)", Sep. 4, 2007, 2 pages. EyeTools. Part III: What is a heatmap . . . really? [Online] [Cited: Nov. 1, 2012.] Retrieved from the Internet: URL:http://eyetools.com/articles/p3-understanding-eye-tracking-what-is-a-heatmap-really.
Himanshu, et al., "A Review of Face Recognition". International Journal of Research in Engineering & Applied Sciences. Feb. 2012, vol. 2, pp. 835-846. Retrieved from the Internet: URL:http://euroasiapub.org/IJREAS/Feb2012/81.pdf.
Huang L., et al., "Clickjacking: Attacks and Defenses". S.I. : Usenix Security 2012, pp. 1-16, 2012 [online]. Retrieved from the Internet: URL:https://www.usenix.org/system/files/conference/usenixsecurity12/sec12-final39.pdf.
International Preliminary Report on Patentability for Application No. PCT/US2015/028924 dated Nov. 17, 2016, 9 pages.
International Preliminary Report on Patentability for Application No. PCT/US2015/028927 dated Nov. 17, 2016, 10 pages.
International Preliminary Report on Patentability for Application No. PCT/US2015/042786, dated Feb. 9, 2017, 7 pages.
International Preliminary Report on Patentability for Application No. PCT/US2015/042799, dated Feb. 9, 2017, 7 pages.
International Preliminary Report on Patentability for Application No. PCT/US2015/042870, dated Feb. 9, 2017, 8 pages.
International Preliminary Report on Patentability for Application No. PCT/US2015/050348, dated Mar. 30, 2017, 7 pages.
International Preliminary Report on Patentability for Application No. PCT/US2015/42783, dated Feb. 9, 2017, 12 pages.
International Preliminary Report on Patentability for Application No. PCT/US2015/42827, dated Feb. 9, 2017, 6 pages.
International Search Report and Written Opinion for Application No. PCT/US2015/028924 dated Jul. 30, 2015, 10 pages.
International Search Report and Written Opinion for Application No. PCT/US2015/042786, dated Oct. 16, 2015, 8 pages.
International Search Report and Written Opinion for Application No. PCT/US2015/042799, dated Oct. 16, 2015, 8 pages.
International Search Report and Written Opinion for Application No. PCT/US2015/042870, dated Oct. 30, 2015, 9 pages.
International Search Report and Written Opinion for Application No. PCT/US2015/050348, dated Dec. 22, 2015, 9 pages.
International Search Report and Written Opinion for Application No. PCT/US2015/42783, dated Oct. 19, 2015, 13 pages.
International Search Report and Written Opinion for Application No. PCT/US2015/42827, dated Oct. 30, 2015, 9 pages.
International Search Report and Written Opinion for Application No. PCT/US2017/045534, dated Nov. 27, 2017, 14 pages.
Jafri R., et al. "A Survey of Face Recognition Techniques," Journal of Information Processing Systems, 2009, vol. 5 (2), pp. 41-68.
Julian J., et al., "Biometric Enabled Portable Trusted Computing Platform," Trust Security and Privacy in Computing and Communications (TRUSTCOM), 2011 IEEE 10th International Conference on Nov. 16, 2011, pp. 436-442, XP032086831, DOI:10.1109/TRUSTCOM.2011.56, ISBN: 978-1-4577-2135-9.
Kim H.C., et al., "A Design of One-Time Password Mechanism Using Public Key Infrastructure," Networked Computing and Advanced Information Management, 2008, NCM'08, 4th International Conference on IEEE, Sep. 2, 2008, pp. 18-24.
Kollreider K., et al., "Evaluating Liveness by Face Images and the Structure Tensor," Halmstad, Sweden: s.n., Halmstad University, SE-30118, Sweden, [online], 2005, Retrieved from the Internet: URL: http://citeseerx.ist.psu.edu/viewdoc/download?doi=10.1.1.62.6534&rep=rep1 &type=pdf, pp. 75-80.
Kollreider K., et al., "Non-Instrusive Liveness Detection by Face Images," Image and Vision Computing, 2007, vol. 27 (3), pp. 233-244.
Kong S., et al. "Recent Advances in Visual and Infrared Face Recognition: A Review," Journal of Computer Vision and Image Understanding, 2005, vol. 97 (1), pp. 103-135.
Li J., et al., "Live Face Detection Based on the Analysis of Fourier Spectra," Biometric Technology for Human Identification, 2004, pp. 296-303.
Linux.com, "The source for Linux information," 2012, 3 pages, downloaded from http://www.linux.com/ on Jan. 28, 2015.
Lubin, G., et al., "16 Heatmaps That Reveal Exactly Where People Look," Business Insider, [online], May 21, 2012, [Cited: Nov. 1, 2012], Retrieved from the Internet: URL: http://www.businessinsider.com/eye-tracking-heatmaps-2012-5?pp=1, pp. 1-21.
Maatta J., et al., "Face Spoofing Detection From Single Images Using Micro-Texture Analysis," Machine Vision Group, University of Oulu, Finland, Oulu, IEEE, [online], 2011, Retrieved from the Internet URL: http://www.ee.oulu.fi/research/mvmp/mvg/files/pdf/131.pdf., pp. 1-7.
Marcialis G.L., et al. "First International Fingerprint Liveness Detection Competition—Livdet 2009," Image Analysis and Processing—ICIAP, Springer Berlin Heidelberg, 2009. pp. 12-23.
Martins R A., et al., "A Potpourri of Authentication Mechanisms the Mobile Device Way," CISTI, Jan. 2013, pp. 843-848.
Mobile Device Security Using Transient Authentication, IEEE Transactions on Mobile Computing, 2006, vol. 5 (11), pp. 1489-1502.
National Science & Technology Council's Subcommittee on Biometrics. Biometrics Glossary. 33 pages, Last updated Sep. 14, 2006. NSTC. http://www.biometrics.gov/documents/glossary.pdf.
Nielsen, Jakib. useit.com. Jakob Nielsen's Alertbox—Horizontal Attention Leans Left. [Online] Apr. 6, 2010. [Cited: Nov. 1, 2012.] 4 pages. http://www.useit.com/alertbox/horizontal-attention.html.
Nielsen, Jakob. useit.com. Jakob Nielsen's Alertbox—Scrolling and Attention. [Online] Mar. 22, 2010. [Cited: Nov. 1, 2012.] 6 pages. http://www.useit.com/alertbox/scrolling-attention.html.
Niinuma K., et al., "Continuous User Authentication Using Temporal Information," Apr. 2010, http://www.cse.msu.edu/biometrics/Publications/Face/NiinumaJain_ContinuousAuth_SPIE10.pdf, 11 pages.

(56) References Cited

OTHER PUBLICATIONS

Non-Final Office Action from U.S. Appl. No. 13/730,761 dated Feb. 27, 2014, 24 pages.
Non-Final Office Action from U.S. Appl. No. 13/730,761 dated Sep. 9, 2014, 36 pages.
Final Office Action from U.S. Appl. No. 14/218,646, dated Aug. 9, 2018, 23 pages.
Non-Final Office Action from U.S. Appl. No. 14/218,646, dated Dec. 31, 2018, 42 pages.
Non-Final Office Action from U.S. Appl. No. 14/218,646, dated Mar. 7, 2018, 32 pages.
Chen L., "Direct Anonymous Attestation," Oct. 12, 2005, retrieved from https://trustedcomputinggroup.org/wp-content/uploads/051012_DAA-slides.pdf on Apr. 2, 2018, 27 pages.
Communication pursuant to Article 94(3) EPC for Application No. 15786796.1, dated Oct. 23, 2018, 4 pages.
Communication Pursuant to Rules 70(2) and 70a(2) EPC for European Application No. 15786487.7, dated Nov. 9, 2017, 1 page.
Communication Pursuant to Rules 70(2) and 70a(2) EPC for European Application No. 15827363.7, dated Mar. 13, 2018, 1 page.
Corrected Notice of Allowance from U.S. Appl. No. 15/396,452, dated Aug. 30, 2018, 17 pages.
Corrected Notice of Allowance from U.S. Appl. No. 14/066,273, dated Feb. 8, 2018, 4 pages.
Corrected Notice of Allowance from U.S. Appl. No. 15/396,454, dated Sep. 28, 2018, 24 pages.
Decision to Grant from foreign counterpart Japanese Patent Application No. 2015-550778, dated Jul. 25, 2018, 6 pages.
Extended European Search Report for Application No. 15826364.0, dated Feb. 20, 2018, 6 pages.
Extended European Search Report for Application No. 15827363.1, dated Feb. 22, 2018, 7 pages.
Extended European Search Report for Application No. 15828152.7, dated Feb. 20, 2018, 8 pages.
Extended European Search Report for Application No. 15841530.7, dated Mar. 26, 2018, 8 pages.
Final Office Action from U.S. Appl. No. 14/145,466, dated Nov. 20, 2018, 28 pages.
Final Office Action from U.S. Appl. No. 14/218,677, dated May 31, 2018, 16 pages.
Final Office Action from U.S. Appl. No. 14/268,563, dated Dec. 27, 2018, 47 pages.
Final Office Action from U.S. Appl. No. 15/229,254, dated Aug. 23, 2018, 16 pages.
Final Office Action from U.S. Appl. No. 14/218,575 dated Sep. 5, 2018, 19 pages.
Final Office Action from U.S. Appl. No. 14/218,611, dated May 3, 2018, 20 pages.
Final Office Action from U.S. Appl. No. 14/218,692, dated Apr. 17, 2018, 99 pages.
Final Office Action from U.S. Appl. No. 14/218,743, dated Feb. 7, 2018, 27 pages.
Final Office Action from U.S. Appl. No. 15/396,452, dated Feb. 27, 2018, 24 pages.
Kim et al., "Secure User Authentication based on the Trusted Platform for Mobile Devices," EURASIP Journal on Wireless Communications and Networking, Sep. 29, 2016, pp. 1-15.
Monden A., et al., "Remote Authentication Protocol," Multimedia, Distributed, Cooperative and Mobile Symposium (DICOM02007), Information Processing Society of Japan, Jun. 29, 2007, pp. 1322-1331.
Non-Final Office Action from U.S. Appl. No. 14/218,677, dated Dec. 26, 2018, 32 pages.
Non-Final Office Action from U.S. Appl. No. 14/218,692, dated Jul. 31, 2018, 40 pages.
Non-Final Office Action from U.S. Appl. No. 14/145,466, dated May 11, 2018, 33 pages.
Non-Final Office Action from U.S. Appl. No. 14/268,563, dated Jun. 28, 2018, 56 pages.
Non-Final Office Action from U.S. Appl. No. 15/881,522, dated Jun. 6, 2018, 87 pages.
Non-Final Office Action from U.S. Appl. No. 15/900,620, dated Oct. 19, 2018, 66 pages.
Non-Final Office Action from U.S. Appl. No. 14/218,575, dated Mar. 8, 2018, 29 pages.
Non-Final Office Action from U.S. Appl. No. 14/218,677, dated Feb. 2, 2018, 25 pages.
Non-Final Office Action from U.S. Appl. No. 15/229,254, dated Feb. 14, 2018, 75 pages.
Non-Final Office Action from U.S. Appl. No. 15/954,188, dated Sep. 7, 2018, 41 pages.
Notice of Allowance from U.S. Appl. No. 15/396,454, dated Nov. 16, 2018, 34 pages.
Notice of Allowance from foreign counterpart Chinese Patent Application No. 201480031042.X, dated Jul. 23, 2018, 5 pages.
Notice of Allowance from foreign counterpart Taiwan Patent Application No. 106125986, dated Jul. 6, 2018, 7 pages.
Notice of Allowance from U.S. Appl. No. 14/218,743, dated Aug. 1, 2018, 18 pages.
Notice of Allowance from U.S. Appl. No. 14/448,814, dated May 9, 2018, 12 pages.
Notice of Allowance from U.S. Appl. No. 15/396,452, dated Jul. 2, 2018, 23 pages.
Notice of Allowance from U.S. Appl. No. 14/066,273, dated Jan. 18, 2018, 26 pages.
Notice of Allowance from U.S. Appl. No. 14/218,504, dated May 31, 2018, 95 pages.
Notice of Allowance from U.S. Appl. No. 14/218,692, dated Dec. 5, 2018, 13 pages.
Notice of Allowance from U.S. Appl. No. 14/859,328, dated Feb. 1, 2018, 18 pages.
Notice of Allowance from U.S. Appl. No. 15/396,454, dated Sep. 18, 2018, 79 pages.
Notification for Granting Patent Right and Search Report from foreign counterpart Chinese Patent Application No. 201380068869.3, dated May 4, 2018, 10 pages.
Notification of Reason for Rejection from foreign counterpart Japanese Patent Application No. 2016-505506, dated Feb. 13, 2018, 6 pages.
Notification of Reasons for Rejection from foreign counterpart Japanese Patent Application No. 2016-0516743, dated Apr. 23, 2018, 12 pages.
Oasis Standard, "Authentication Context for the OASIS Security Assertion Markup Language (SAML) V2.0," Mar. 15, 2005, 70 pages.
Office Action and Search Report from foreign counterpart Taiwan Patent Application No. 106125986, dated Mar. 19, 2018, 6 pages.
Office Action from foreign counterpart Japanese Patent Application No. 2015-550778, dated Feb. 7, 2018, 14 pages.
"OpenID Connect Core 1.0—draft 17," Feb. 3, 2014, 70 pages.
Watanabe H., et al., "The Virtual Wearable Computing System Assumed Widely Movement," the multimedia, distribution and cooperation which were taken into consideration, mobile (DICOMO2009) symposium collected-papers [CD-ROM], Japan, Information Processing Society of Japan, Jul. 1, 2009, and vol. 2009 (1), pp. 1406-1414. (Abstract only in English).
Communication pursuant to Article 94(3) EPC for Application No. 15841530.7, dated Feb. 8, 2019, 4 pages.
International Preliminary Report on Patentability for Application No. PCT/US2017/045534, dated Feb. 14, 2019, 11 pages.
International Search Report and Written Opinion for PCT Application No. PCT/US2018/062608, dated Mar. 28, 2019, 12 pages.
Notice of Reasons for Rejection from foreign counterpart Japanese Patent Application No. 2017-505513, dated Oct. 22, 2018, 6 pages.

\* cited by examiner

WEB-BASED USER AUTHENTICATION TECHNIQUES AND APPLICATIONS

CROSS REFERENCE TO RELATED APPLICATIONS

This application is a continuation of copending U.S. patent application Ser. No. 14/268,733, filed May 2, 2014, all of which is herein incorporated by reference.

BACKGROUND

Field of the Invention

This invention relates generally to the field of data processing systems. More particularly, the invention relates to an apparatus and method for Web-based user authentication techniques and associated applications.

Description of Related Art

Systems have also been designed for providing secure user authentication over a network using biometric sensors. In such systems, the score generated by an authenticator, and/or other authentication data, may be sent over a network to authenticate the user with a remote server. For example, Patent Application No. 2011/0082801 ("'801 Application") describes a framework for user registration and authentication on a network which provides strong authentication (e.g., protection against identity theft and phishing), secure transactions (e.g., protection against "malware in the browser" and "man in the middle" attacks for transactions), and enrollment/management of client authentication tokens (e.g., fingerprint readers, facial recognition devices, smartcards, trusted platform modules, etc).

The assignee of the present application has developed a variety of improvements to the authentication framework described in the '801 application. Some of these improvements are described in the following set of U.S. patent applications ("Co-pending Applications"), which are assigned to the present assignee: Ser. No. 13/730,761, Query System and Method to Determine Authentication Capabilities; Ser. No. 13/730,776, System and Method for Efficiently Enrolling, Registering, and Authenticating With Multiple Authentication Devices; Ser. No. 13/730,780, System and Method for Processing Random Challenges Within an Authentication Framework; Ser. No. 13/730,791, System and Method for Implementing Privacy Classes Within an Authentication Framework; Ser. No. 13/730,795, System and Method for Implementing Transaction Signaling Within an Authentication Framework; and Ser. No. 14/218,504, Advanced Authentication Techniques and Applications (hereinafter "'504 Application").

Briefly, the Co-Pending Applications describe authentication techniques in which a user enrolls with authentication devices (or Authenticators) such as biometric devices (e.g., fingerprint sensors) on a client device. When a user enrolls with a biometric device, biometric reference data is captured by the biometric sensor of the authentication device (e.g., by swiping a finger, snapping a picture, recording a voice, etc). The user may subsequently register the authentication devices with one or more servers over a network (e.g., Websites or other relying parties equipped with secure transaction services as described in the Co-Pending Applications), and subsequently authenticate with those servers using data exchanged during the registration process (e.g., cryptogtaphic keys provisioned into the authentication devices). Once authenticated, the user is permitted to perform one or more online transactions with a Website or other relying party. In the framework described in the Co-Pending Applications, sensitive information such as fingerprint data and other data which can be used to uniquely identify the user, may be retained locally on the user's authentication device to protect a user's privacy. The '504 Application describes a variety of additional techniques including techniques for designing composite authenticators, intelligently generating authentication assurance levels, using non-intrusive user verification, transferring authentication data to new authentication devices, augmenting authentication data with client risk data, and adaptively applying authentication policies, and creating trust circles, to name just a few.

The World Wide Web Consortium has specified a new set of Javascript Application Programming Interfaces (APIs) that allows local media, including audio and video, to be requested from a platform. See, e.g., World Wide Web Consortium, W3C Working Draft: Media Capture and Streams (2013). Modern browsers such as Chrome® 21, Opera® 18, Firefox® 17 and their successors supporting these APIs can capture audio and video from a local device such as a video camera or microphone.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Figure 1A:
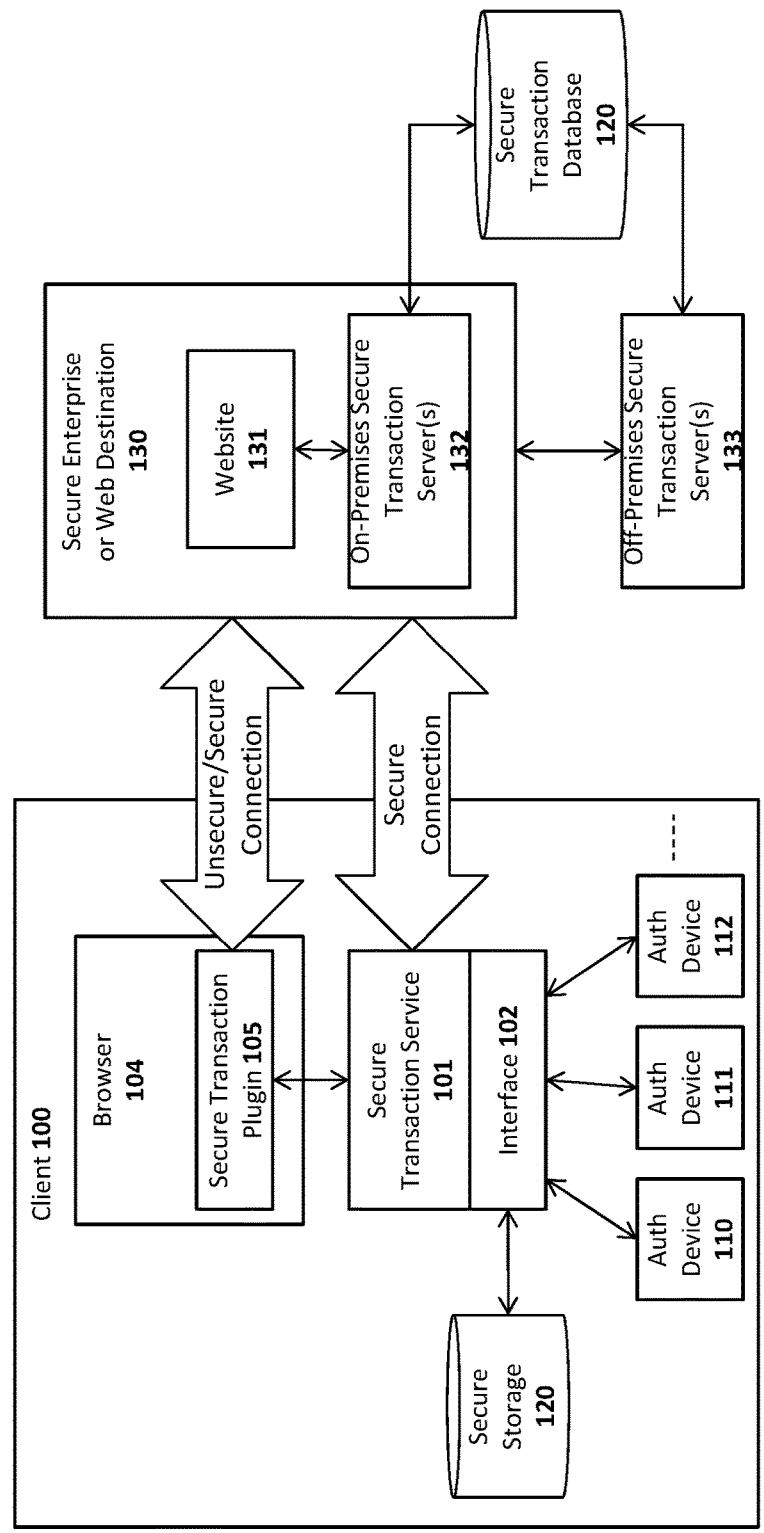
FIGS. 1A-B illustrate two different embodiments of a secure authentication system architecture.

Described below are embodiments of an apparatus, method, and machine-readable medium for implementing advanced authentication techniques and associated applications. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

The embodiments of the invention discussed below involve authentication devices with user verification capabilities such as biometric modalities or PIN entry. These devices are sometimes referred to herein as "tokens," "authentication devices," or "authenticators." While certain embodiments focus on facial recognition hardware/software (e.g., a camera and associated software for recognizing a user's face and tracking a user's eye movement), some embodiments may utilize additional biometric devices including, for example, fingerprint sensors, voice recognition hardware/software (e.g., a microphone and associated software for recognizing a user's voice), and optical recognition capabilities (e.g., an optical scanner and associated software for scanning the retina of a user). The user verification capabilities may also include non-biometric modalities, like PIN entry. The authenticators might use devices like trusted platform modules (TPMs), smartcards and secure elements for cryptographic operations and key storage.

In a mobile biometric implementation, the biometric device may be remote from the relying party. As used herein, the term "remote" means that the biometric sensor is not part of the security boundary of the computer it is communicatively coupled to (e.g., it is not embedded into the same physical enclosure as the relying party computer). By way of example, the biometric device may be coupled to the relying party via a network (e.g., the Internet, a wireless network link, etc) or via a peripheral input such as a USB port. Under these conditions, there may be no way for the relying party to know if the device is one which is authorized by the relying party (e.g., one which provides an acceptable level of authentication strength and integrity protection) and/or whether a hacker has compromised or even replaced the biometric device. Confidence in the biometric device depends on the particular implementation of the device.

The term "local" is used herein to refer to the fact that the user is completing a transaction in person, at a particular location such as at an automatic teller machine (ATM) or a point of sale (POS) retail checkout location. However, as discussed below, the authentication techniques employed to authenticate the user may involve non-location components such as communication over a network with remote servers and/or other data processing devices. Moreover, while specific embodiments are described herein (such as an ATM and retail location) it should be noted that the underlying principles of the invention may be implemented within the context of any system in which a transaction is initiated locally by an end user.

The term "relying party" is sometimes used herein to refer, not merely to the entity with which a user transaction is attempted (e.g., a Website or online service performing user transactions), but also to the secure transaction servers implemented on behalf of that entity which may performed the underlying authentication techniques described herein. The secure transaction servers may be owned and/or under the control of the relying party or may be under the control of a third party offering secure transaction services to the relying party as part of a business arrangement.

The term "server" is used herein to refer to software executed on a hardware platform (or across multiple hardware platforms) that receives requests over a network from a client, responsively performs one or more operations, and transmits a response to the client, typically including the results of the operations. The server responds to client requests to provide, or help to provide, a network "service" to the clients. Significantly, a server is not limited to a single computer (e.g., a single hardware device for executing the server software) and may, in fact, be spread across multiple hardware platforms, potentially at multiple geographical locations.

Exemplary System Architectures

Figure 1B:
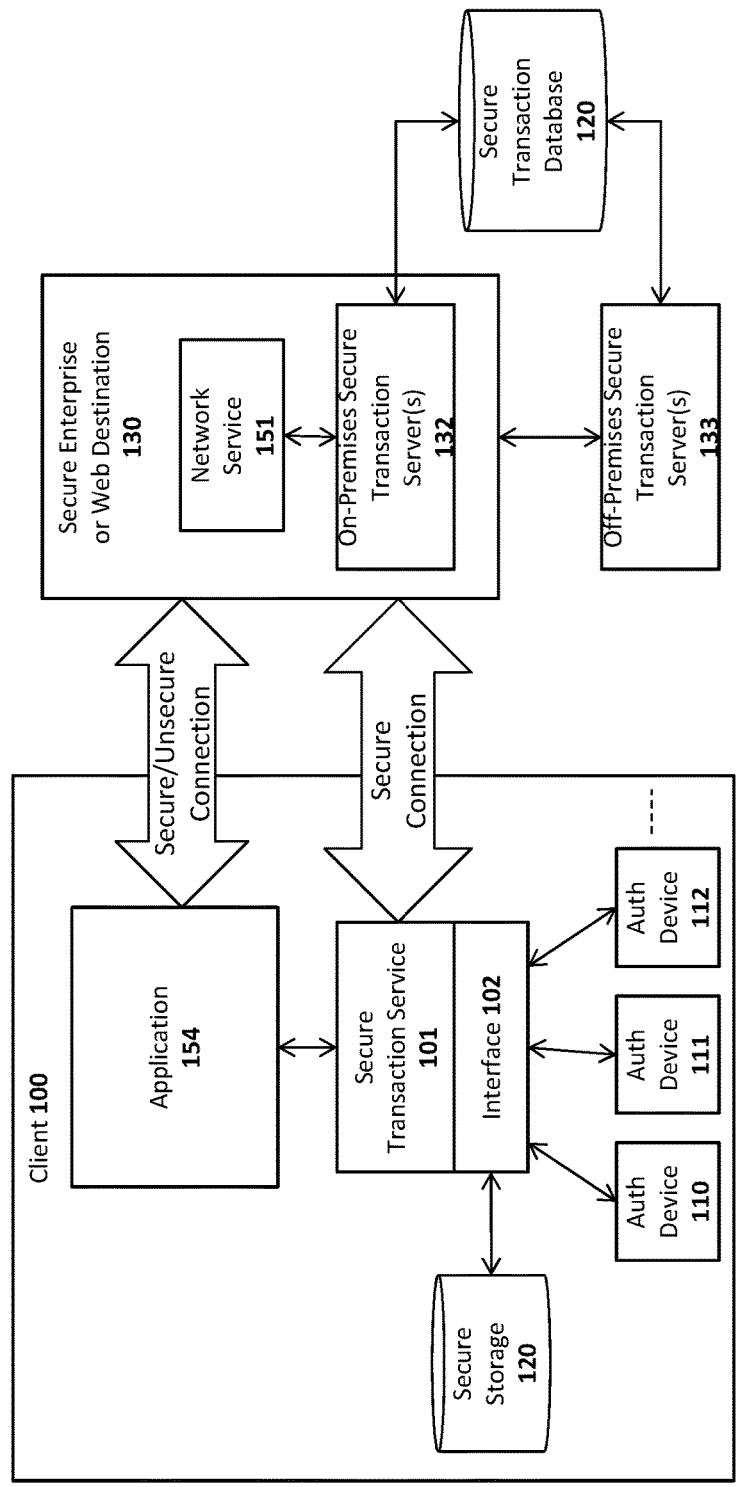

FIGS. 1A-B illustrate two embodiments of a system architecture comprising client-side and server-side components for authenticating a user. The embodiment shown in FIG. 1A uses a web browser plugin-based architecture for communicating with a website while the embodiment shown in FIG. 1B does not require a web browser. The various techniques described herein such as enrolling a user with authentication devices, registering the authentication devices with a secure server, and verifying a user may be implemented on either of these system architectures. Thus, while the architecture shown in FIG. 1A is used to demonstrate the operation of several of the embodiments described below, the same basic principles may be easily implemented on the system shown in FIG. 1B (e.g., by removing the browser plugin 105 as the intermediary for communication between the server 130 and the secure transaction service 101 on the client).

Turning first to FIG. 1A, the illustrated embodiment includes a client 100 equipped with one or more authentication devices 110-112 (sometimes referred to in the art as authentication "tokens" or "Authenticators") for enrolling and verifying an end user. As mentioned above, the authentication devices 110-112 may include biometric device such as fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user) and support for non-biometric modalities, such as PIN verification. The authentication devices might use trusted platform modules (TPMs), smartcards or secure elements for cryptographic operations and key storage.

The authentication devices 110-112 are communicatively coupled to the client through an interface 102 (e.g., an application programming interface or API) exposed by a secure transaction service 101. The secure transaction service 101 is a secure application for communicating with one or more secure transaction servers 132-133 over a network and for interfacing with a secure transaction plugin 105 executed within the context of a web browser 104. As illustrated, the Interface 102 may also provide secure access to a secure storage device 120 on the client 100 which stores information related to each of the authentication devices 110-112 such as a device identification code, user identification code, user enrollment data (e.g., scanned fingerprint or other biometric data) protected by he authentication device, and keys wrapped by the authentication device used to perform the secure authentication techniques described herein. For example, as discussed in detail below, a unique key may be stored into each of the authentication devices and used when communicating to servers 130 over a network such as the Internet.

As discussed below, certain types of network transactions are supported by the secure transaction plugin 105 such as HTTP or HTTPS transactions with websites 131 or other servers. In one embodiment, the secure transaction plugin is initiated in response to specific HTML tags inserted into the HTML code of a web page by the web server 131 within the secure enterprise or Web destination 130 (sometimes simply referred to below as "server 130"). In response to detecting such a tag, the secure transaction plugin 105 may forward transactions to the secure transaction service 101 for processing. In addition, for certain types of transactions (e.g., such as secure key exchange) the secure transaction service 101 may open a direct communication channel with the on-premises transaction server 132 (i.e., co-located with the website) or with an off-premises transaction server 133.

The secure transaction servers 132-133 are coupled to a secure transaction database 120 for storing user data, authentication device data, keys and other secure information needed to support the secure authentication transactions described below. It should be noted, however, that the underlying principles of the invention do not require the separation of logical components within the secure enterprise or web destination 130 shown in FIG. 1A. For example, the website 131 and the secure transaction servers 132-133 may be implemented within a single physical server or separate physical servers. Moreover, the website 131 and transaction servers 132-133 may be implemented within an integrated software module executed on one or more servers for performing the functions described below.

As mentioned above, the underlying principles of the invention are not limited to a browser-based architecture shown in FIG. 1A. FIG. 1B illustrates an alternate implementation in which a stand-alone application 154 utilizes the functionality provided by the secure transaction service 101 to authenticate a user over a network. In one embodiment, the application 154 is designed to establish communication sessions with one or more network services 151 which rely on the secure transaction servers 132-133 for performing the user/client authentication techniques described in detail below.

In either of the embodiments shown in FIGS. 1A-B, the secure transaction servers 132-133 may generate the keys which are then securely transmitted to the secure transaction service 101 and stored into the authentication devices within the secure storage 120. Additionally, the secure transaction servers 132-133 manage the secure transaction database 120 on the server side.

Device Registration, Authentication, and Transaction Confirmation

In one embodiment of the invention, strong authentication between a client and an authentication service is carried over different channels (e.g., to different relying parties). As such, certain basic principles associated with registering and authenticating with an authentication service will be described with respect to FIGS. 2-5, followed by a detailed description of embodiments of the invention for carrying strong authentication over different channels.

Figure 2:
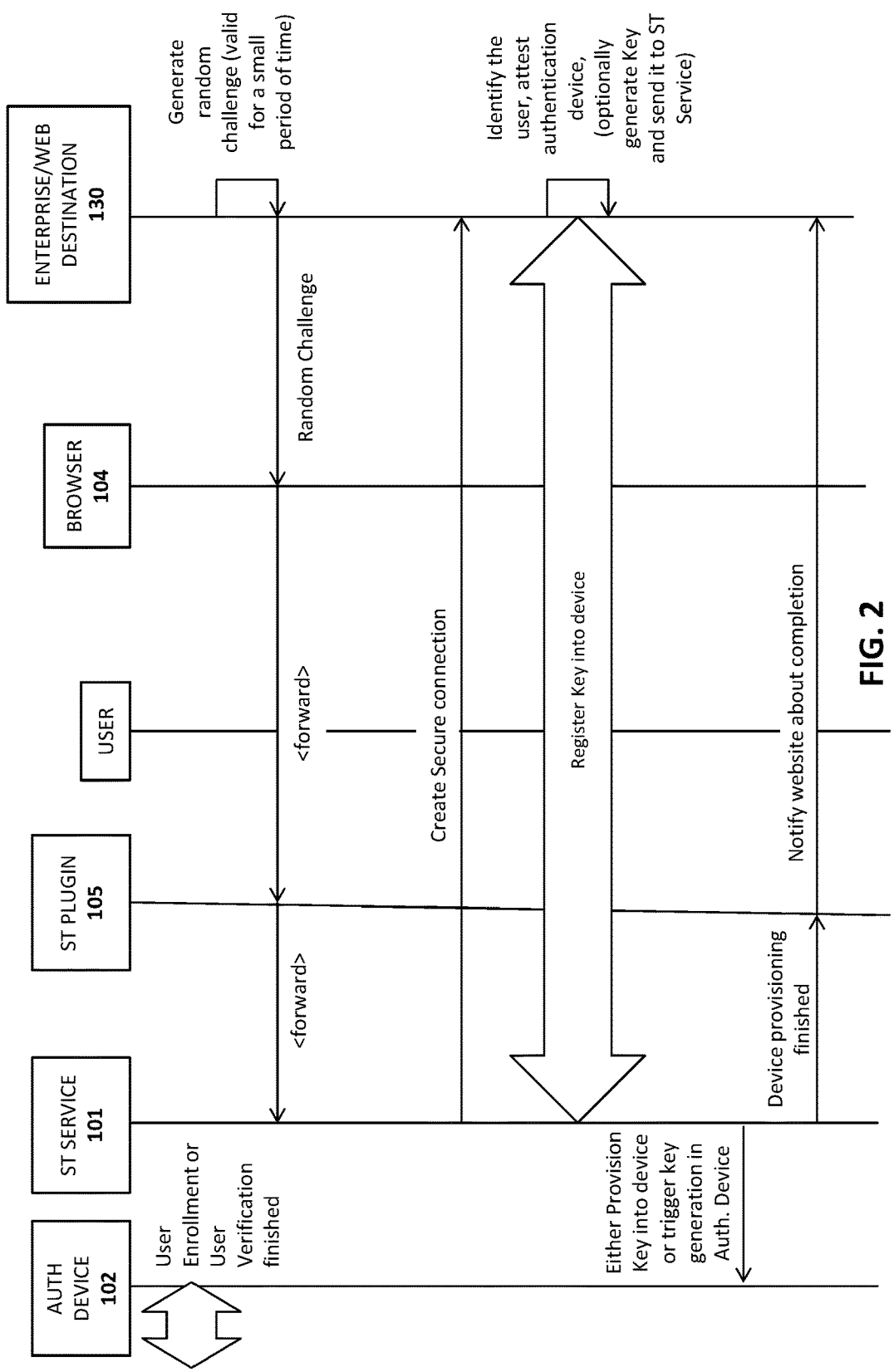
FIG. 2 is a transaction diagram showing how keys may be registered into authentication devices.

FIG. 2 illustrates a series of transactions for registering authentication devices. During registration, a key is shared between the authentication device and one of the secure transaction servers 132-133. The key is stored within the secure storage 120 of the client 100 and the secure transaction database 120 used by the secure transaction servers 132-133. In one embodiment, the key is a symmetric key generated by one of the secure transaction servers 132-133. However, in another embodiment discussed below, asymmetric keys may be used. In this embodiment, the public key may be stored by the secure transaction servers 132-133 and a second, related private key may be stored in the secure storage 120 on the client. Moreover, in another embodiment, the key(s) may be generated on the client 100 (e.g., by the authentication device or the authentication device interface rather than the secure transaction servers 132-133). The underlying principles of the invention are not limited to any particular types of keys or manner of generating the keys.

A secure key provisioning protocol such as the Dynamic Symmetric Key Provisioning Protocol (DSKPP) may be used to share the key with the client over a secure communication channel (see, e.g., Request for Comments (RFC) 6063). However, the underlying principles of the invention are not limited to any particular key provisioning protocol.

Turning to the specific details shown in FIG. 2, once the user enrollment or user verification is complete, the server 130 generates a randomly generated challenge (e.g., a cryptographic nonce) that must be presented by the client during device registration. The random challenge may be valid for a limited period of time. The secure transaction plugin detects the random challenge and forwards it to the secure transaction service 101. In response, the secure transaction service initiates an out-of-band session with the server 130 (e.g., an out-of-band transaction) and communicates with the server 130 using the key provisioning protocol. The server 130 locates the user with the user name, validates the random challenge, validates the device's authentication code if one was sent, and creates a new entry in the secure transaction database 120 for the user. It may also generate the key, write the key to the database 120 and send the key back to the secure transaction service 101 using the key provisioning protocol. Once complete, the authentication device and the server 130 share the same key if a symmetric key was used or different keys if asymmetric keys were used.

Figure 3:
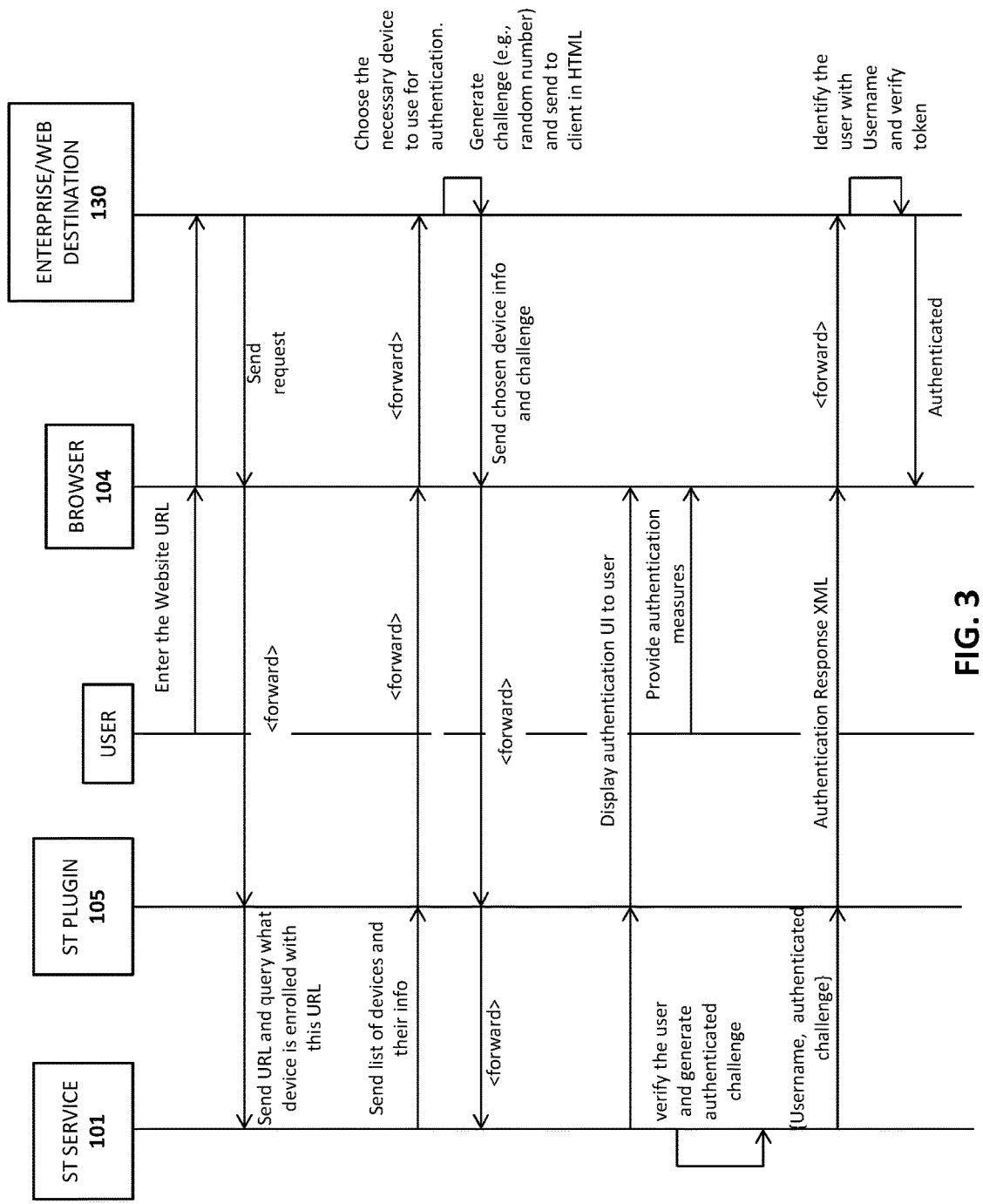
FIG. 3 illustrates a transaction diagram showing remote authentication.

FIG. 3 illustrates a series of transactions for user authentication with the registered authentication devices. Once device registration is complete the server 130 will accept a token generated by the local authentication device as a valid authentication token.

Turning to the specific details shown in FIG. 3, which shows a browser-based implementation, the user enters the uniform resource locator (URL) of the server 130 in the browser 104. In an implementation which uses a stand alone application or mobile device app (rather than a browser), the user may enter a network address for a network service or the application or app may automatically attempt to connect to the network service at the network address.

For a browser-based implementation, the website embeds a query for registered devices in the HTML page. This may be done in many ways other than embedding the query in an HTML page, such as through Javascript or using HTTP headers. The secure transaction plugin 105 receives the URL and sends it to secure transaction service 101, which searches the looks into the secure storage 120 (which, as discussed, includes a database of authentication device and user information) and determines whether there is a user enrolled within this URL. If so, the secure transaction service 101 sends a list of provisioned devices associated with this URL to the secure transaction plugin 105. The secure transaction plugin then calls the registered JavaScript API and passes this information to the server 130 (e.g., the website). The server 130 chooses the appropriate device from the sent device list, generates a random challenge and sends the device information, and argument back to the client. The website displays the corresponding user interface and asks for authentication from the user. The user then provides the requested authentication measure (e.g., swiping a finger across the fingerprint reader, speaking for voice recognition, etc). The secure transaction service 101 identifies the user (this step can be skipped for devices which don't support storing users), obtains the username from the database, generates an authentication token using the key and sends this information to the website via the secure transaction plugin. The server 130 identifies the user from the secure transaction database 120 and verifies the token by generating the same token on the server 130 (e.g., using its copy of the key). Once verified, the authentication process is complete.

Figure 4:
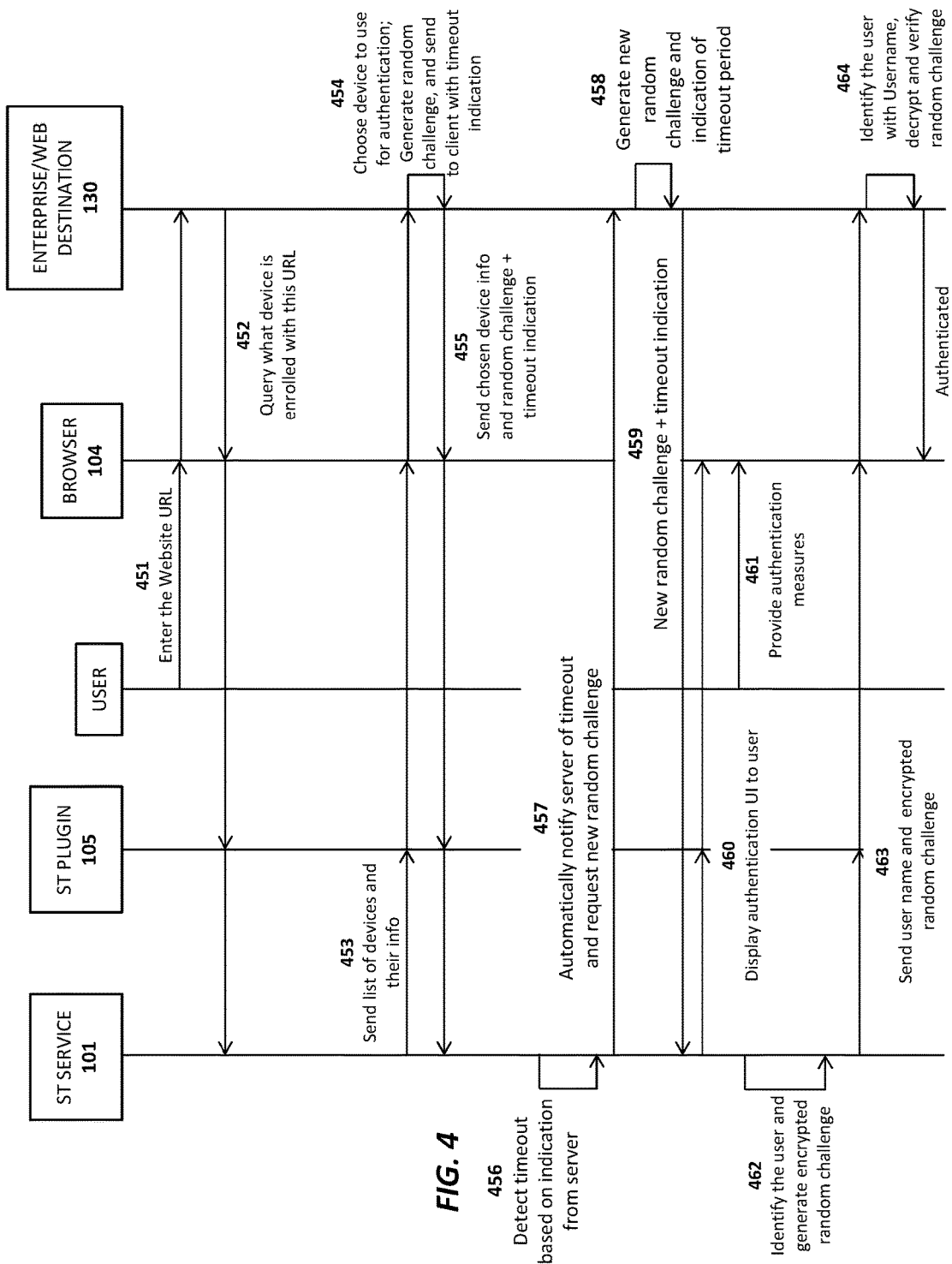
FIG. 4 illustrate one embodiment of the invention for authenticating with a relying party.

FIG. 4 illustrates another embodiment of an authentication process in which the client automatically detects that the challenge has expired and transparently requests a new challenge from the server (i.e., without user intervention). The server then generates a new random challenge and transmits it to the client which may then use it to establish secure communication with the server. The end user experience is improved because the user does not receive an error or denial of an authentication request.

At 451, the user enters a particular website URL into the browser 104 and is directed to the web server 131 within the enterprise/web destination servers 130 which includes the secure transaction servers 132-133. At 452, a query is sent back to the secure transaction service (via the browser and plugin) to determine which device(s) are registered with the website's URL. The secure transaction service 101 queries the secure storage 720 on the client 100 to identify a list of devices which are sent back to the server 130 at 453. At 454, the server 454 chooses a device to use for authentication, generates a random challenge and a timeout indication and, at 455, sends this information back to the secure transaction service 101.

At 456, the secure transaction service 456 automatically detects that the random challenge is no longer valid upon reaching the end of the timeout period. Various different techniques may be employed for indicating and detecting the end of the timeout period. In one embodiment, the timeout period comprises a period of time for which the random challenge is considered valid. After the timeout period has elapsed, the random challenge is no longer considered valid by the server 130. In one embodiment, the timeout period is specified simply as a point in time at which the random challenge will no longer be valid. Once this point in time is reached, the random challenge is invalid. In another embodiment, the timeout period is specified by using a current timestamp (i.e., the time at which the random challenge is generated by the server 130) and a duration. The secure transaction service 101 may then calculate the timeout time by adding the duration value to the timestamp to calculate the point in time when the random challenge becomes invalid. It should be noted, however, that the underlying principles of the invention are not limited to any specific technique for calculating the timeout period.

Upon detecting the expiration of the random challenge, at 457, the secure transaction service 101 transparently (i.e., without user intervention) notifies the server 130 and requests a new random challenge. In response, at 458, the server 130 generates a new random challenge and a new indication of the timeout period. As mentioned, the new timeout period may be the same as previously sent to the client or may be modified. In either case, at 459, the new random challenge and timeout indication are sent to the secure transaction service 101.

The remainder of the transaction diagram shown in FIG. 4 operates in substantially the same manner as described above (see, e.g., FIG. 3). For example, at 460, an authentication user interface is displayed (e.g., directing the user to swipe a finger on a fingerprint sensor) and, at 461, the user provides authentication (e.g., swipes a finger on the fingerprint scanner). At 462, the secure transaction service verifies the identity of the user (e.g., comparing the authentication data collected from the user with that stored in the secure storage 720) and uses the key associated with the authentication device to encrypt the random challenge. At 463, the user name (or other ID code) and the encrypted random challenge are sent to the server 130. Finally, at 464, the server 130 identifies the user within the secure transaction database 120 using the user name (or other ID code), and decrypts/verifies the random challenge using the key stored in the secure transaction database 120 to complete the authentication process.

Figure 5:
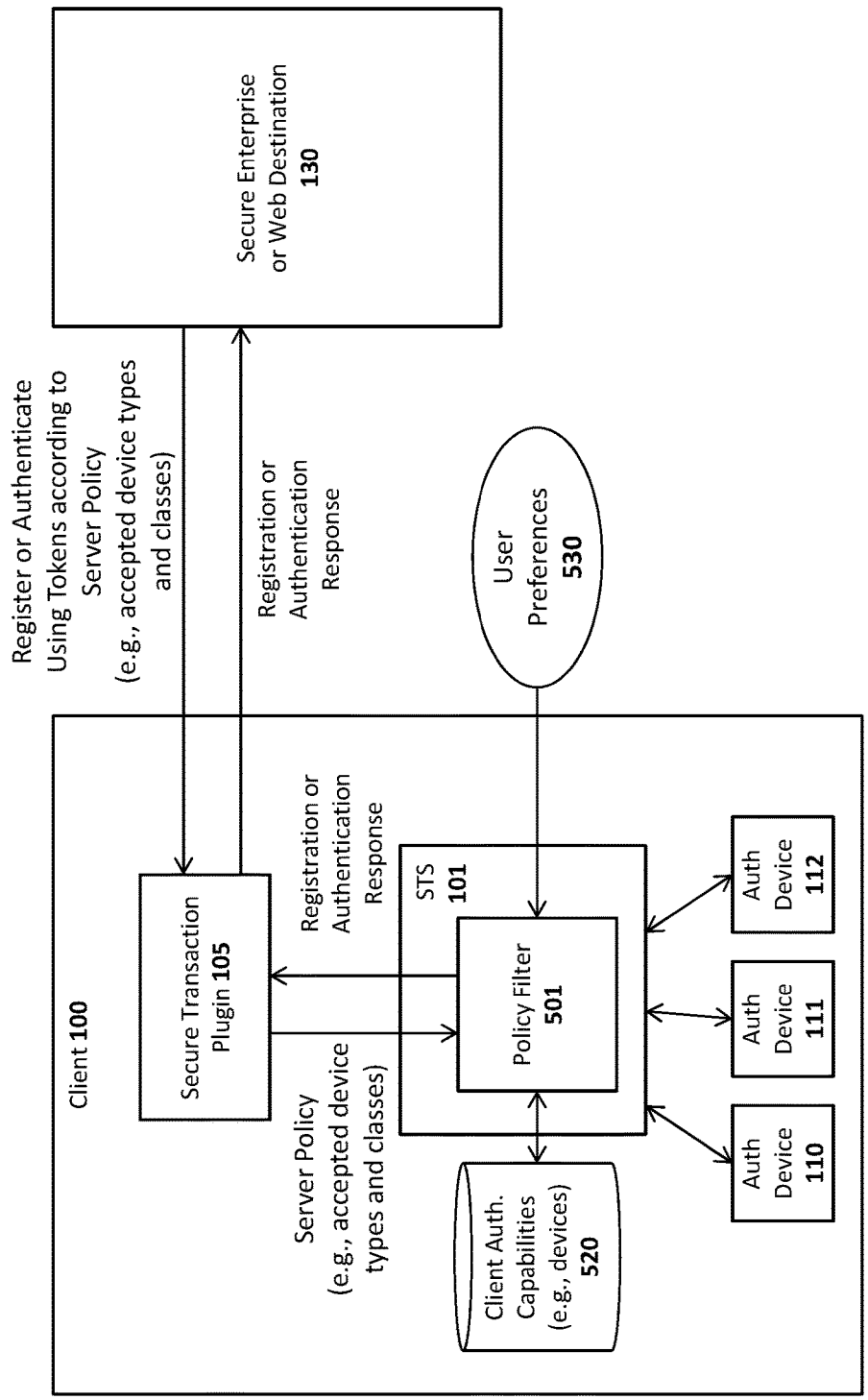
FIG. 5 illustrates how a registration or authentication operation may be implemented with a query policy.

FIG. 5 illustrates one embodiment of a client-server architecture for implementing these techniques. As illustrated, the secure transaction service 101 implemented on the client 100 includes a policy filter 401 for analyzing the policy provided by the server 130 and identifying a subset of authentication capabilities to be used for registration and/or authentication. In one embodiment, the policy filter 401 is implemented as a software module executed within the context of the secure transaction service 101. It should be noted, however, that the policy filter 401 may be implemented in any manner while still complying with the underlying principles of the invention and may include software, hardware, firmware, or any combination thereof.

The particular implementation shown in FIG. 5 includes a secure transaction plugin 105 for establishing communication with the secure enterprise or Web destination 130 (sometimes referred to simply as "server 130" or "relying party" 130) using techniques previously discussed. For example, the secure transaction plugin may identify a specific HTML tag inserted into the HTML code by a web server 131. Thus, in this embodiment, the server policy is provided to the secure transaction plugin 105 which forwards it to the secure transaction service 101 implementing the policy filter 501.

The policy filter 501 may determine the client authentication capabilities by reading the capabilities from the client's secure storage area 520. As previously discussed, the secure storage 520 may comprise a repository of all of the client's authentication capabilities (e.g., identification codes for all of the authentication devices). If the user has already enrolled the user with its authentication devices, the user's enrollment data is stored within the secure storage 520. If the client has already registered an authentication device with a server 130, then the secure storage may also store an encrypted secret key associated with each authentication device.

Using the authentication data extracted from the secure storage 520 and the policy provided by the server, the policy filter 501 may then identify a subset of authentication capabilities to be used. Depending on the configuration, the policy filter 501 may identify a complete list of authentication capabilities supported by both the client and the server or may identify a subset of the complete list. For example, if the server supports authentication capabilities A, B, C, D, and E and the client has authentication capabilities A, B, C, F, and G, then the policy filter 501 may identify the entire subset of common authentication capabilities to the server: A, B, and C. Alternatively, if a higher level of privacy is desired, as indicated by user preferences 530 in FIG. 5, then a more limited subset of authentication capabilities may be identified to the server. For example, the user may indicate that only a single common authentication capability should be identified to the server (e.g., one of A, B or C). In one embodiment, the user may establish a prioritization scheme for all of the authentication capabilities of the client 100 and the policy filter may select the highest priority authentication capability (or a prioritized set of N authentication capabilities) common to both the server and the client.

Depending on what operation has been initiated by server 130 (Registration or Authentication), the secure transaction service 130 performs that operation on the filtered subset of authentication devices (110-112) and sends the operation response back to server 130 via the secure transaction plugin 105 as shown in FIG. 5. Alternatively, in an embodiment which does not rely on a plugin 105 component of a Web browser, the information may be passed directly from the secure transaction service 101 to the server 130.

System and Method for Web-Based User Authentication Techniques and Applications

In one embodiment of the invention, browsers that allow local media (e.g., audio and video) to be requested from a computing platform are used to support voice and video capture for user registration and authentication. For example, in one embodiment, the browser media capture and stream API is used to capture audio and video during registration and authentication with a remote server (e.g., such as the relying party's secure transaction servers described above). This capability allows web applications to implement user authentication via biometric matching without the need for additional client software (including browser extensions). For example, user authentication via voice/face matching may be performed directly from web applications running in the browser. In some embodiments described below, it is assumed that the user has already created an account with the relying party, which has a unique identifier such as user name.

Figure 6:
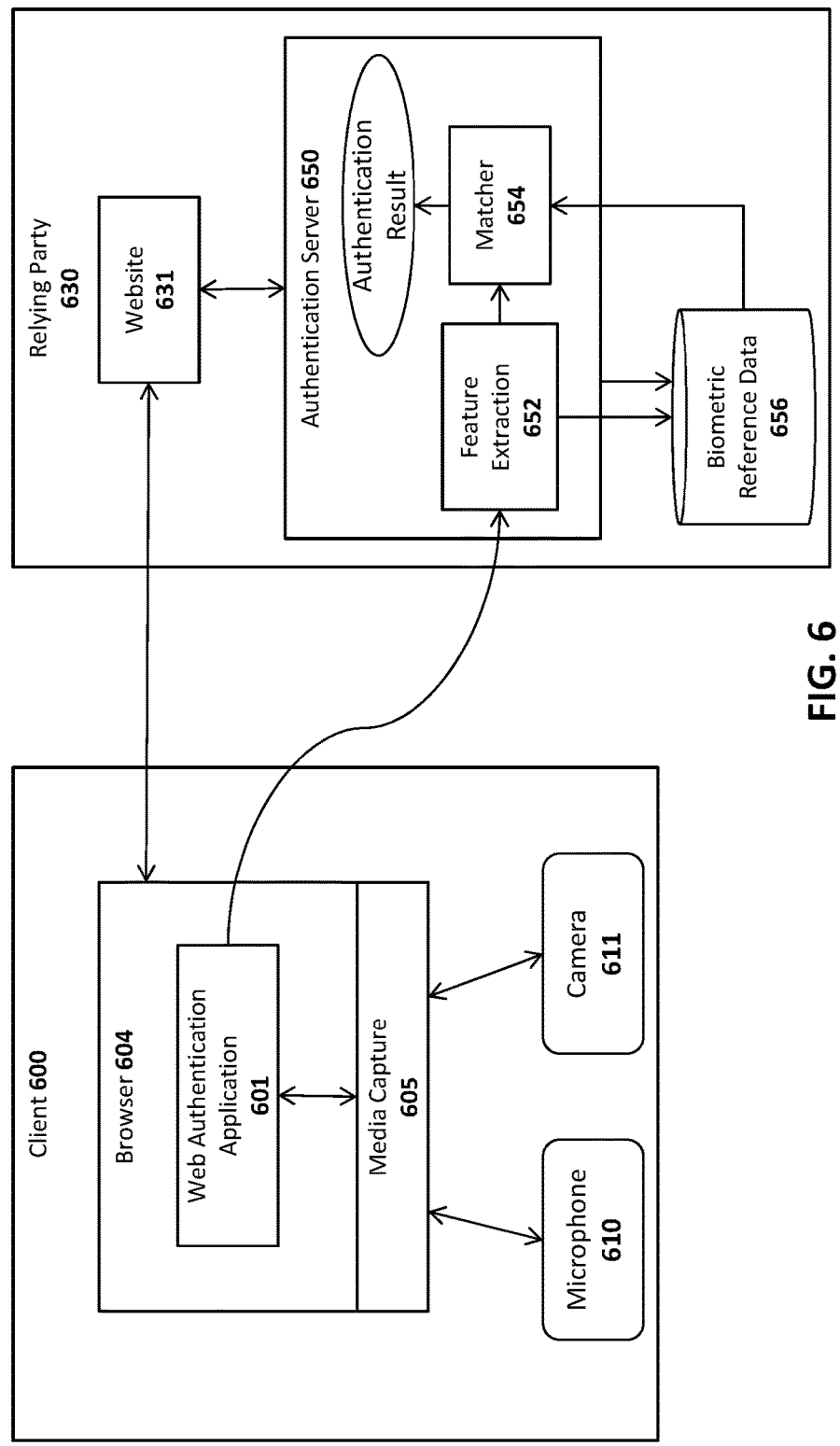
FIG. 6 illustrates one embodiment of a system for performing web-based authentication.

FIG. 6 illustrates a client 600 with a browser 604 equipped with media capture logic 605 and a Web authentication application 601 for coordinating the registration and authentication techniques described herein. In one embodiment, the web authentication application 601 captures raw audio (e.g., the user's voice) and video (e.g., snapshots of the user's face, hands, ears, fingers or other portions of the user's body usable for authentication purposes) via an API exposed by the media capture logic 605. The web authentication application 601 captures the raw audio and video to generate biometric reference data (during registration) and to authenticate the user using voice recognition, face recognition, or recognition of other portions of the user's body (as described in detail below).

As illustrated, the media capture logic 605 may interface with a microphone 610 for capturing audio and with a camera 611 for capturing video. The medial capture logic 605 may access the microphone 610 and camera 611 via the device drivers configured on the client 600 for these devices. In one embodiment, the media capture logic 605 comprises the Javascript Media Capture and Streams API (see World Wide Web Consortium, W3C Working Draft: Media Capture and Streams (2013)). However, the underlying principles of the invention are not limited to any particular type of program code or API implementation.

In the embodiments described below, the user registers and authenticates remotely with a relying party 630 having a website 631 and one or more authentication servers 650. For registration, the user initially logs in his/her account at the website 631 from the browser 604. The browser 604 and the authentication server 650 may then establish a secure communication channel using a protocol such as secure sockets layer (SSL) or transport layer security (TLS) (although the underlying principles of the invention are not limited to any particular secure communication protocol).

In one embodiment, the web application 601 running in the browser 604 then prompts the user to enroll his/her voice/face/body part biometric. For voice, this process may record the user's speech of certain words or phrases using the microphone 610 and provide the raw voice data to the web authentication application 601 via the media capture logic 605 API (e.g., with the web authentication application 601 making a call to the API to gather the voice data). For facial recognition authentication, this may involve taking a snapshot of the user's face with the camera 611 and providing the raw image data to the web authentication application 601 via the media capture logic 605 API (e.g., with the web authentication application 601 making a call to the API to gather the image). For other body parts, this may involve capturing an image of the user's hand shape, tip of a finger (for fingerprint recognition), ear shape, iris pattern, or any other image which may be used for authentication purposes (i.e., for which a biometric matching algorithm may be employed).

In one embodiment, the web application 601 sends the raw biometric data to the authentication server 650. A feature extraction module 652 on the authentication server 650 extracts specified characteristics of the raw biometric data (e.g., focusing on certain regions of the user's face or other body part, certain characteristics of the user's voice, etc) to generate biometric reference data 656 that will be used for future authentication. For example, the feature extraction module 652 may extract certain spectral features of the user's voice and/or certain geometric or photometric characteristics of the image of the user's face or other body part to generate the biometric reference data 656. In one embodiment, the biometric reference data 656 is stored in a database and associated with the user's account at the relying party 630.

Once the biometric reference data 656 is stored, the following operations may be used for authentication. The browser 604 and authentication server 650 establish a secure communication channel (e.g., via SSL/TLS or other security protocol) and the user provides a user ID or other identification code in the web authentication application 601. The web authentication application 601 may then prompt the user to authenticate using his/her voice, face, or other portion of the user's body. For example, the user may be prompted to speak one or more words via the microphone 610 or to capture a facial/body part image via the camera 611. The media capture logic 605 may the provide the voice recording or image to the web authentication application 601.

The web authentication application 601 sends the user's identifier and the captured raw biometric data to the authentication server 650. In one embodiment, the authentication server 650 queries for the stored biometric reference data 656 with the user's identifier. Matcher logic 654 compares the biometric reference data 656 with certain features of the raw biometric data extracted by the feature extraction logic 652 and generates an authentication result. In one embodiment, the feature extraction module 652 is configured to extract the same features as those extracted during the registration process (e.g., spectral characteristics of the user's voice, geometric or photometric characteristics of the user's image, etc). The underlying principles of the invention are not limited to any particular set of extracted features. Any set of features which are useful for performing voice recognition, face recognition, or recognition of any portion of the user's body may be used.

In one embodiment, the "authentication result" comprises a score based on the similarity between the extracted features and the biometric reference data 110. The authentication server 650 may then use the score to determine whether the authentication was successful (e.g., if the score is above a certain specified threshold).

Figure 7:
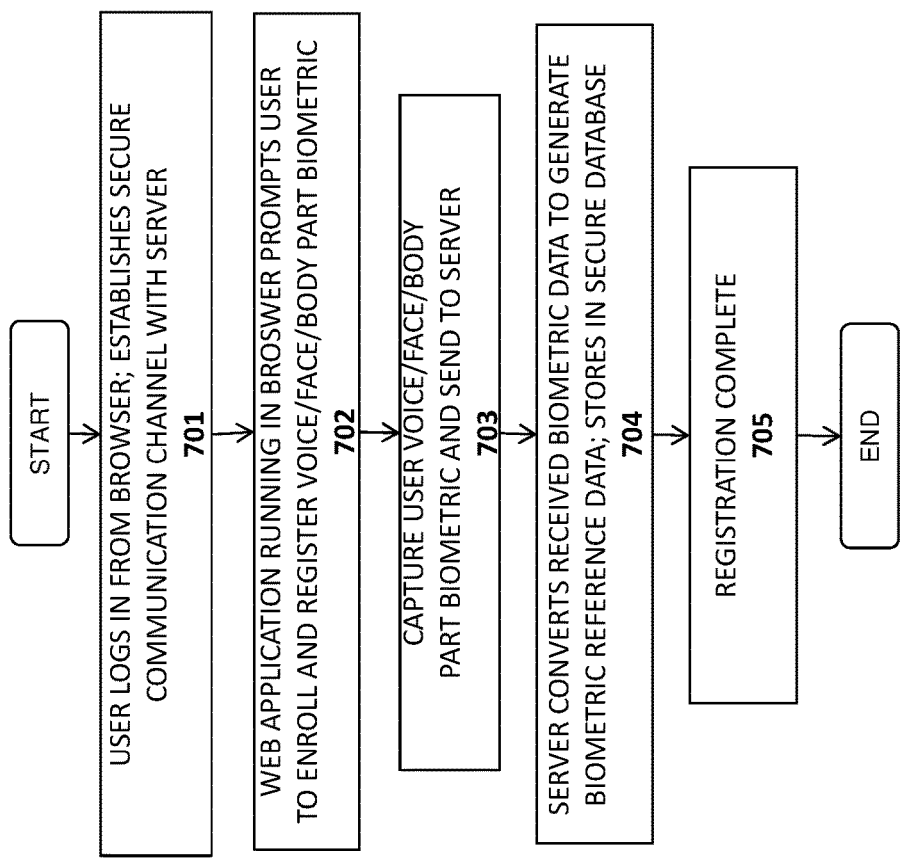
FIG. 7 illustrates one embodiment of a method for registering biometric data with a server.
Figure 8:
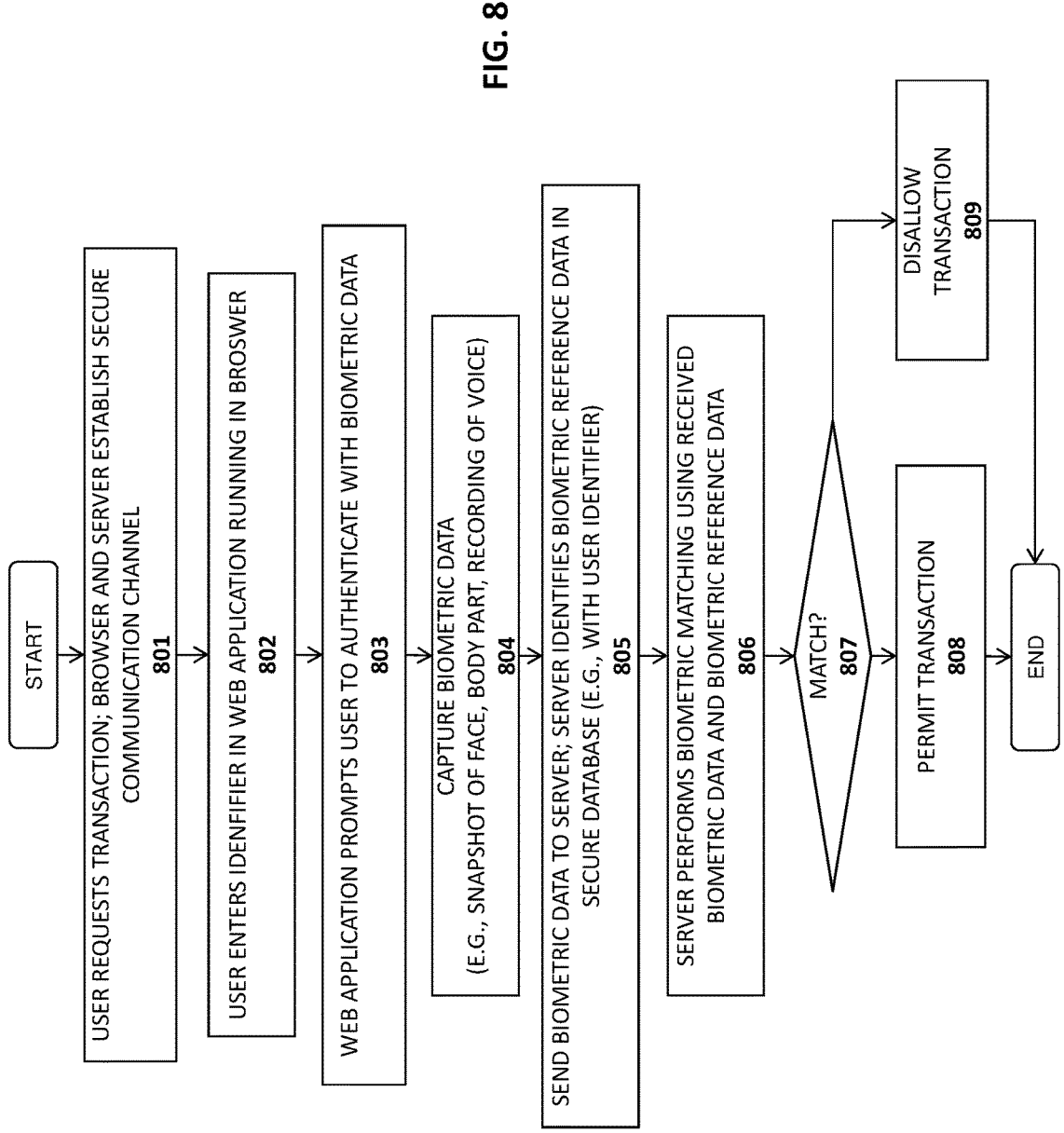
FIG. 8 illustrates one embodiment of a method for authenticating using web-based authentication.

FIG. 7 illustrates a registration method and FIG. 8 illustrates an authentication method in accordance with one embodiment of the invention. The method shown in FIGS. 7-8 may be performed using the architecture shown in FIG. 6, but are not limited to any particular architecture.

At 701, the user logs into a website of the relying party from a browser and establishes a secure communication channel with a server of the relying party. At 702, a Web application running in the browser prompts the user to enroll and register a new face/body part or voice biometric. At 703, the user's voice is sampled from a microphone and/or a picture of the user's face or other body part is captured with a camera on the client. As mentioned, in one embodiment, the voice/video is captured using built-in media capture logic within the browser context. At 704, the server receives and converts the raw biometric data to generate biometric reference data. For example, certain characteristics of the user's voice may be extracted from the raw voice data and/or certain characteristics of the user's face or other body part may be extracted from the raw video image(s). The resulting biometric reference data may be associated with the user's account and saved in a database (from which it may subsequently be accessed during authentication). At 705 the registration process is complete.

Turning to the authentication method of FIG. 8, at 801, the user attempts to enter into a transaction requiring authentication and, in response, the browser and the authentication server establish a secure communication channel (e.g., via SSL/TLS). At 802, the user enters his/her identifier in the web application running in the browser and, at 803, the web application prompts the user to authenticate using his/her voice/face/body part (e.g., recording the user's speech of certain words/phrases and/or taking a snapshot of the user's face or other body part). At 804, the biometric data is captured via the browser. As mentioned above, to capture the user's voice/face/body part biometric, one embodiment of the invention initiates a call to the dedicated media capture logic built into the browser (e.g., the web application calls the Javascript Media Capture and Streams API).

At 805, the web application sends the user's identifier and the captured raw biometric data to the server. At 806, the server identifies the stored biometric reference data based on the user's identifier and performs biometric matching based on extracted characteristics of the raw biometric data (e.g., characteristics of the raw voice/video data). If a match is detected, determined at 807, then the transaction is permitted at 808; if not, then the transaction is denied at 809 and/or additional authentication techniques are requested. As mentioned, a "match" may be determined by calculating a score based on the correlation between the characteristics extracted from the raw biometric data and the biometric reference data, and determining whether the score is above a specified threshold.

Figure 9:
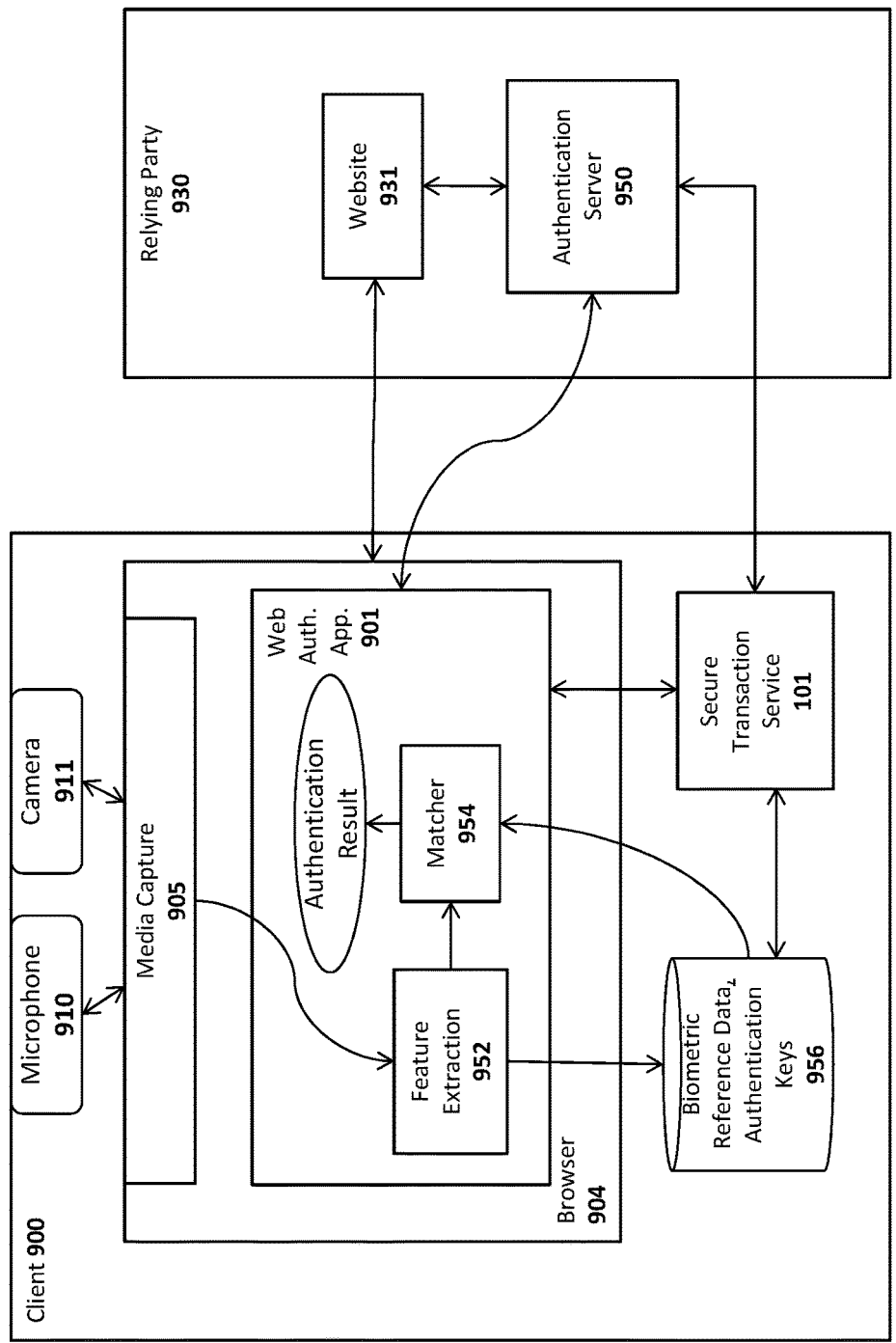
FIG. 9 illustrates one embodiment of a system for performing web-based authentication.

FIG. 9 illustrates another embodiment in which the operations of generating biometric reference data and matching are performed in the client 900. In particular, in this embodiment, the web authentication application 901 (executed within browser 904) includes a feature extraction module 952 for extracting specified characteristics of the user's voice/face/body part and storing the resulting biometric reference data in a secure storage 956 on the client 900. In one embodiment, the feature extraction module 952 operations in the same or a similar manner to the feature extraction module 652 in FIG. 6. In addition, the matcher module 954 performs matching between the biometric reference data and raw voice/face/body part biometric data during authentication in the same or a similar manner as the matcher 654 shown in FIG. 6 (with the primary difference being that the matcher 954 is executed within the web authentication application 901 in FIG. 9).

As in FIG. 6, the web authentication application 901 captures raw audio (e.g., the user's voice) and video (e.g., snapshots of the user's face or other portion of the user's body) via an API exposed by the media capture logic 905 configured in the browser 904 (e.g., to capture the biometric reference data during registration and to authenticate the user using voice, face, and/or body part recognition). As illustrated, the media capture logic 905 may interface with a microphone 910 for capturing audio and with a camera 911 for capturing video. The medial capture logic 905 may access the microphone 910 and camera 911 via the device drivers configured on the client 900 for these devices. In one embodiment, the media capture logic 905 comprises the Javascript Media Capture and Streams API (see World Wide Web Consortium, W3C Working Draft: Media Capture and Streams (2013)). However, the underlying principles of the invention are not limited to any particular type of program code or API implementation.

In operation, the user logs in to his/her account on a relying party 930 website 931 from the browser 904 (e.g., using a user name/password). The browser 904 then establishes a secure communication channel (e.g., via SSL/TLS) with an authentication server 950 and (if not already registered) receives a registration request from the authentication server 950. The web authentication application 901 may process the registration request using the remote registration techniques described above (e.g., generating a public/private key pair, performing policy filtering, etc). If the registration policy permits, the web authentication application 901 prompts the user to enroll his/her voice/face/body part biometric (e.g., recording the user's speech of certain phrases and/or taking a snapshot of the user's face or other body part). As in prior embodiments, to capture the user's voice/face/body part biometric, the web application 901 may call the media capture logic 905 (e.g., using a Javascript Media Capture and Streams API).

In one embodiment, the web authentication application 901 processes the captured user biometric data and may convert the data to the form that it may used for authentication. For example, the web authentication application 901 may converts the raw biometric data to generate biometric reference data, stored within a secure storage 956 on the client 900. For example, certain characteristics of the user's voice may be extracted from the raw voice data and/or certain characteristics of the user's face or other portion of the user's body may be extracted from the raw video image(s). In one embodiment, using the media capture logic 905, this series of operations take place within the browser 904.

In one embodiment, the web authentication application generates a private/public key pair as described for some embodiments above. Once generated, the web authentication application 901 may securely store the private key within secure storage 956 and send a secure registration response to the authentication server 950 containing the public key. In one embodiment, the authentication server 950 may then store the public key in a database entry associated with the user's account. In one embodiment, the public/private key generation (and all other key-based operations) are implemented using the Javascript Web- Crypto API. However, the underlying principles of the invention are not limited to any particular type of program code for processing and managing keys. Once the keys have been successfully generated and exchanged, the registration process terminates.

For authentication, in response to the user attempting to enter into a transaction with the relying party 930, the browser 904 and the authentication server 950 establish a secure communication channel (e.g., via SSL/TLS). The web authentication application 901 running in the browser initiates authentication with the authentication server 950, which then transmits an authentication request to the web authentication application 901 Upon receipt, the web authentication application 901 may process the server authentication request as described in the above embodiments (e.g., generating a random challenge, using policy filtering to select authentication methods, etc.). If permitted by the policy, the web authentication application 901 prompts the user to authenticate using a voice biometric, face biometric, or a biometric involving another portion of the user's body. As in prior embodiments, for voice, the media capture logic 905 may use the microphone 910 to capture the user's speech of certain words or phrases. For face/body, the media capture logic 905 may use the camera 911 take a snapshot of the user's face or portion of the user's body. The results are then provided to the web authentication application 901 via a call to the media capture API (e.g., the Javascript Media Capture and Streams API in one embodiment).

In one embodiment, the feature extraction module 952 extracts specified features from the raw voice/face/body part data and the matcher 954 compares the extracted features with features from the biometric reference data 956 to generates an authentication result. In one embodiment, the "authentication result" comprises a score based on the similarity between the extracted features and the biometric reference data 956. The web authentication application may then use the score to determine whether the authentication was successful (e.g., if the score is above a certain specified threshold).

In one embodiment, if authentication is successful, then the web authentication application 901 locates the private key associated with the matching biometric data. It then uses the private key as previously described to perform remote authentication with the authentication server 950 (e.g., using the private key to generate a signature over a challenge provided by the authentication server 950 and/or encrypting a session key to establish a secure channel). In one embodiment, the web authentication application performs all key-related operations using the Javascript WebCrypto API. If authentication is successful, then the relying party 930 will allow the user to perform the desired transaction (e.g., the transaction on the website 931 which prompted the authentication request).

Figure 10:
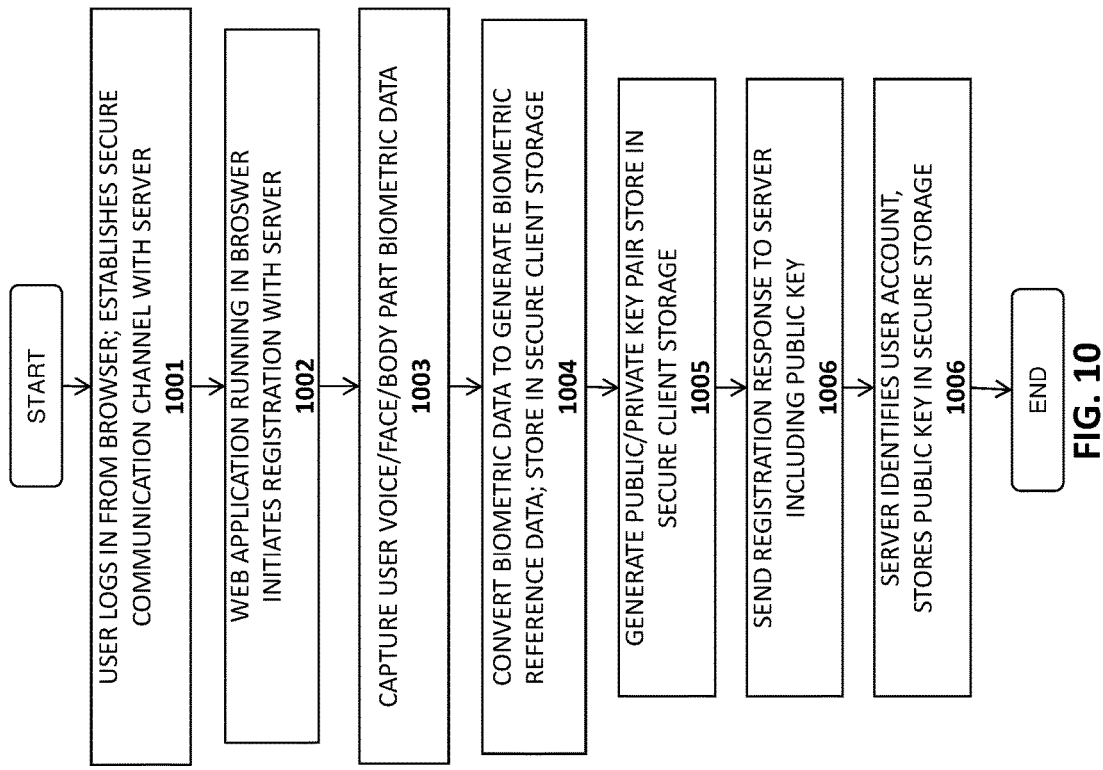
FIG. 10 illustrates one embodiment of a method for registering biometric data with a server.
Figure 11:
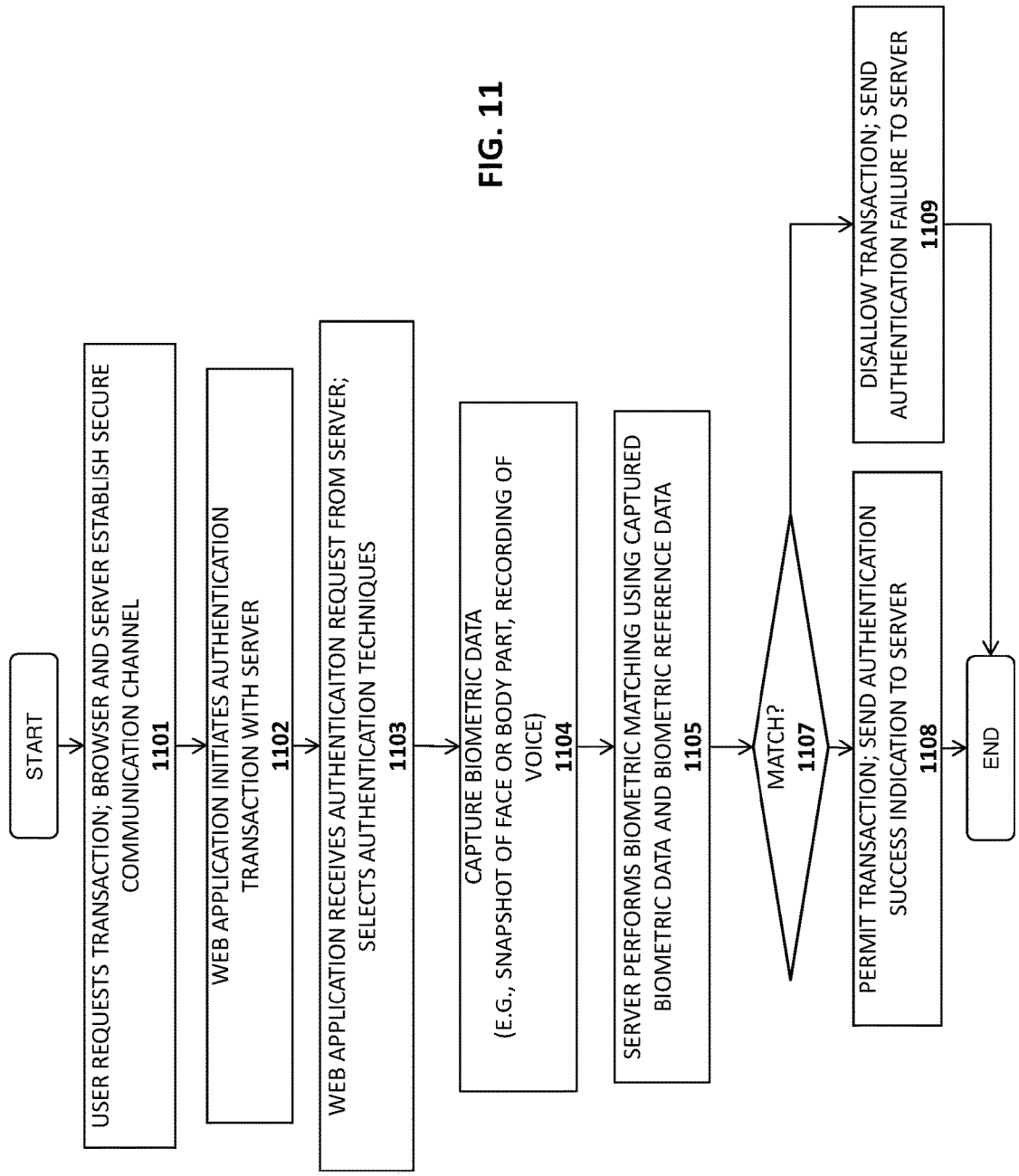
FIG. 11 illustrates one embodiment of a method for authenticating using web-based authentication.

FIG. 10 illustrates a registration method and FIG. 11 illustrates an authentication method in accordance with one embodiment of the invention. In both methods, biometric matching is performed on the client rather than the server. The method shown in FIGS. 10-11 may be performed using the architecture shown in FIG. 9, but are not limited to any particular architecture.

At 1001, the user logs into a website of the relying party from a browser and establishes a secure communication channel with a server of the relying party (e.g., the authentication server described above) and (if not already registered) receives a registration request at 1002 from the authentication server. The web authentication application 901 may process the registration request using the remote registration techniques described above (e.g., generating a public/private key pair, performing policy filtering, etc). If the registration policy permits, at 1003, the web authentication application prompts the user to enroll his/her voice/face/body part biometric (e.g., recording the user's speech of certain phrases and/or taking a snapshot of the user's face or portions of the user's body). The user's voice may be sampled from a microphone and/or a picture of the user's face/body part may be captured with a camera on the client. As mentioned, in one embodiment, the voice/video is captured using built-in media capture logic within the browser context (e.g., using a Javascript Media Capture and Streams API in one embodiment).

At 1004, the server receives and converts the raw biometric data to generate biometric reference data. For example, certain characteristics of the user's voice may be extracted from the raw voice data and/or certain characteristics of the user's face or other body part may be extracted from the raw video image(s). The resulting biometric reference data may be associated with the user's account and saved in a secure storage device on the client (from which it may subsequently be accessed during authentication).

At 1005, the web authentication application generates a public/private key pair and stores the keys within a secure storage on the client (which may be the same or a different storage than that used for the biometric reference data). At 1006, a registration response is sent to the authentication server which includes the public key of the public/private key pair. At 1006, the server identifies the user account (e.g., using the user ID or other identifying code) and securely stores the public key.

FIG. 11 illustrates one embodiment of an authentication method in which biometric matching is performed on the client. At 1101, the user attempts to enter into a transaction requiring authentication and, in response, the browser and the authentication server establish a secure communication channel (e.g., via SSL/TLS). At 1102, the web application initiates an authentication transaction with the authentication server and, at 1103, the authentication server sends an authentication request which is received by the web application. The web application then selects one or more authentication techniques (e.g., based on an authentication policy for the transaction). For example, the web application may select voice authentication, face authentication, authentication of a body part or any combination thereof.

At 1104, the biometric data is captured via the browser. As mentioned above, to capture the user's voice/face/body part biometric, one embodiment of the invention initiates a call to the dedicated media capture logic built into the browser (e.g., the web application calls the Javascript Media Capture and Streams API).

At 1105, the web application compares the biometric reference data with certain features of the raw biometric data extracted in operation 1104 and generates an authentication result. In one embodiment, the same features are extracted as those extracted during the registration process (e.g., spectral characteristics of the user's voice, geometric or photometric characteristics of the user's image, etc). In one embodiment, the "authentication result" comprises a score based on the similarity between the extracted features and the biometric reference data. The web application may then use the score to determine whether the authentication was successful (e.g., if the score is above a certain specified threshold).

If successful, determined at 1107, then the transaction is permitted and an indication of successful authentication is sent to the authentication server at 1108. If not successful, then at 1109 the transaction is disallowed and an authentication failure is sent to the authentication server.

Exemplary Data Processing Devices

Figure 12:
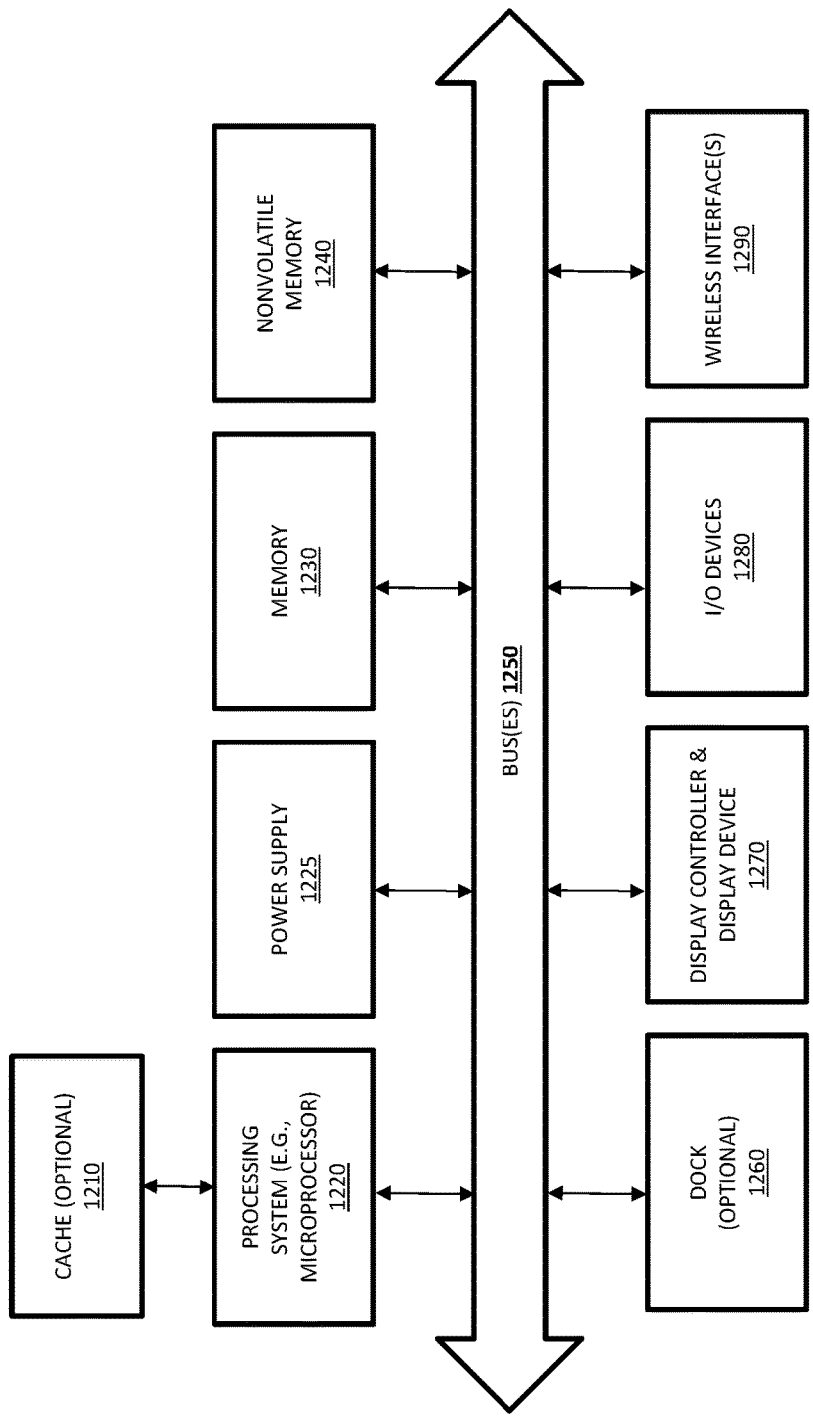
FIGS. 12-13 illustrate exemplary embodiments of a computer system for executing embodiments of the invention.

FIG. 12 is a block diagram illustrating an exemplary clients and servers which may be used in some embodiments of the invention. It should be understood that while FIG. 12 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 12, the computer system 1200, which is a form of a data processing system, includes the bus(es) 1250 which is coupled with the processing system 1220, power supply 1225, memory 1230, and the nonvolatile memory 1240 (e.g., a hard drive, flash memory, Phase-Change Memory (PCM), etc.). The bus(es) 1250 may be connected to each other through various bridges, controllers, and/or adapters as is well known in the art. The processing system 1220 may retrieve instruction(s) from the memory 1230 and/or the nonvolatile memory 1240, and execute the instructions to perform operations as described above. The bus 1250 interconnects the above components together and also interconnects those components to the optional dock 1260, the display controller & display device 1270, Input/Output devices 1280 (e.g., NIC (Network Interface Card), a cursor control (e.g., mouse, touchscreen, touchpad, etc.), a keyboard, etc.), and the optional wireless transceiver(s) 1290 (e.g., Bluetooth, WiFi, Infrared, etc.).

Figure 13:
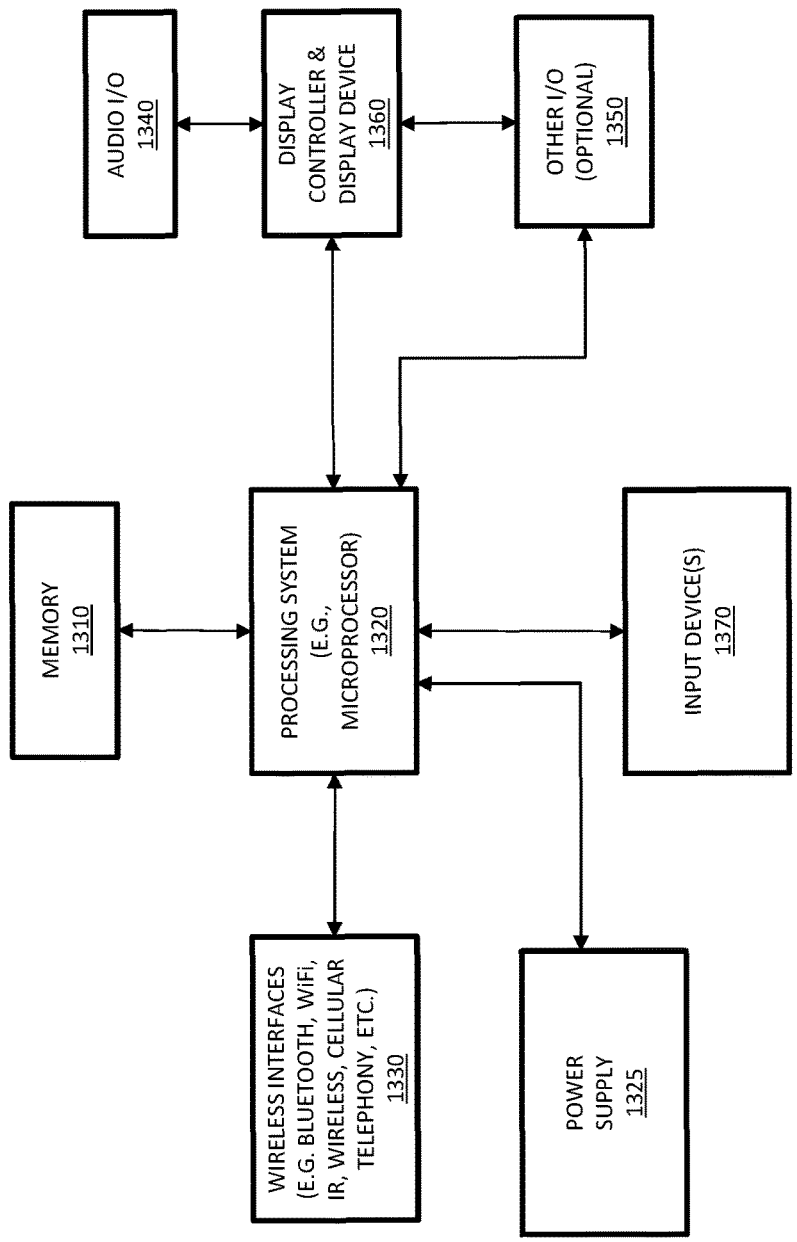

FIG. 13 is a block diagram illustrating an exemplary data processing system which may be used in some embodiments of the invention. For example, the data processing system 1300 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 1300 may be a network computer or an embedded processing device within another device.

According to one embodiment of the invention, the exemplary architecture of the data processing system 1300 may used for the mobile devices described above. The data processing system 1300 includes the processing system 1320, which may include one or more microprocessors and/or a system on an integrated circuit. The processing system 1320 is coupled with a memory 1310, a power supply 1325 (which includes one or more batteries) an audio input/output 1340, a display controller and display device 1360, optional input/output 1350, input device(s) 1370, and wireless transceiver(s) 1330. It will be appreciated that additional components, not shown in FIG. 13, may also be a part of the data processing system 1300 in certain embodiments of the invention, and in certain embodiments of the invention fewer components than shown in FIG. 13 may be used. In addition, it will be appreciated that one or more buses, not shown in FIG. 13, may be used to interconnect the various components as is well known in the art.

The memory 1310 may store data and/or programs for execution by the data processing system 1300. The audio input/output 1340 may include a microphone and/or a speaker to, for example, play music and/or provide telephony functionality through the speaker and microphone. The display controller and display device 1360 may include a graphical user interface (GUI). The wireless (e.g., RF) transceivers 1330 (e.g., a WiFi transceiver, an infrared transceiver, a Bluetooth transceiver, a wireless cellular telephony transceiver, etc.) may be used to communicate with other data processing systems. The one or more input devices 1370 allow a user to provide input to the system. These input devices may be a keypad, keyboard, touch panel, multi touch panel, etc. The optional other input/output 1350 may be a connector for a dock.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

We claim:

1. A system comprising:
   an authentication server of a relying party;
   a client communicatively coupled to the authentication server, the client receiving a request from a user to perform a transaction with the relying party which requires user authentication, the client comprising a secure transaction service to establish a secure communication channel between the authentication server and a web browser (browser) executed on the client;
   media capture logic implemented as a component within the browser, the media capture logic configured to capture a user's voice from a microphone on a client or images of the user's face or other portion of the user's body from a camera on the client, the media capture logic exposing an application programming interface (API); and a web authentication application implemented as another component within the browser for communicating with the authentication server to perform biometric authentication of a user, the web authentication application making calls to the API of the media capture logic to capture raw biometric data comprising the user's voice from the microphone and/or images of the user's face or other portion of the user's body from the camera, the web authentication application to implement a biometric authentication process to authenticate the user with the raw biometric data.

2. The system as in claim 1 wherein the biometric authentication process comprises:
initiating an authentication transaction with the authentication server through the secure communication channel;
receiving an authentication request from the authentication server through the secure communication channel; and
providing the raw biometric data to the authentication server through the secure communication channel, the authentication server comprising a matcher module to compare the raw biometric data with biometric reference data associated with the user to determine a correlation between the raw biometric data and the biometric reference data.

3. The system as in claim 2 wherein a successful authentication is defined based on the correlation being above a specified threshold value.

4. The system as in claim 2 wherein the authentication server further comprises a feature extraction module to extract one or more specified features from the raw biometric data, wherein the matcher module compares the extracted features against corresponding features from the biometric reference data.

5. The system as in claim 4 wherein in response to the authentication server generating a successful authentication indication, the user is provided with access to one or more resources managed by the relying party.

6. The system as in claim 2 wherein the web authentication application is further configured to register with the authentication server using a registration process comprising:
providing the raw biometric data to the authentication server through the secure communication channel;
a feature extraction module on the authentication server extracting specified features of the raw biometric data to generate biometric reference data; and
storing the biometric reference data in a secure storage accessible by the authentication server.

7. The system as in claim 1 wherein the web authentication application comprises a matcher module to compare the raw biometric data with biometric reference data associated with the user to determine a correlation between the raw biometric data and the biometric reference data.

8. The system as in claim 7 wherein a successful authentication is defined based on the correlation being above a specified threshold value, wherein an indication of a successful authentication is transmitted from the web authentication application to the authentication server.

9. The system as in claim 7 wherein the web authentication application further comprises a feature extraction module to extract one or more specified features from the raw biometric data, wherein the matcher module compares the extracted features against corresponding features from the biometric reference data.

10. The system as in claim 9 wherein in response to the web authentication application generating a successful authentication indication, the user is provided with access to one or more resources managed by a relying party.

11. The system as in claim 7 wherein the web authentication application is further configured to register with the authentication server using a registration process, wherein the web authentication application comprising a feature extraction module to extract specified features of the raw biometric data during registration to generate biometric reference data, the biometric reference data being stored within a secure storage accessible by the matcher module.

12. The system as in claim 11 wherein the registration process further comprises:
generating a public/private key pair on the client; and
transmitting a public key of the key pair to the authentication server through the secure communication channel, wherein the authentication server associates the public key with an account of the user and stores the public key in a secure storage.

13. A method to perform web-based user authentication, the method comprising:
implementing media capture logic as a component within a web browser (browser) executed on a client;
implementing a web authentication application as another component within the browser for communicating with an authentication server of a relying party to perform biometric authentication of a user;
receiving, at the client, a request from the user to perform a transaction with the relying party, the transaction requiring user authentication;
establishing a secure communication channel between the web authentication application and the authentication server via a secure transaction service of the client;
initiating an authentication transaction with the authentication server by the web authentication application through the secure communication channel;
receiving an authentication request from the authentication server by the web authentication application through the secure communication channel;
using the media capture logic to capture the user's voice from a microphone on a client or images of the user's face or other portion of the user's body from a camera on the client, the media capture logic exposing an application programming interface (API); and
making calls to the API of the media capture logic from the web authentication application to capture raw biometric data comprising the user's voice from the microphone and/or images of the user's face or other portion of the user's body from the camera, the web authentication application to implement a biometric authentication process to authenticate the user with the raw biometric data.

14. The method as in claim 13, further comprising:
providing the raw biometric data to the authentication server through the secure communication channel, the authentication server comprising a matcher module to compare the raw biometric data with biometric reference data associated with the user to determine a correlation between the raw biometric data and the biometric reference data.

15. The method as in claim 14 wherein a successful authentication is defined based on the correlation being above a specified threshold value.

16. The method as in claim 14 wherein the authentication server further comprises a feature extraction module to extract one or more specified features from the raw biometric data, wherein the matcher module compares the extracted features against corresponding features from the biometric reference data.

17. The method as in claim 16 wherein in response to the authentication server generating a successful authentication indication, the user is provided with access to one or more resources managed by a relying party.

18. The method as in claim 16 wherein the web authentication application is further configured to register with the authentication server using a registration process comprising:
   providing the raw biometric data to the authentication server;
   a feature extraction module on the authentication server extracting specified features of the raw biometric data to generate biometric reference data; and
   storing the biometric reference data in a secure storage accessible by the authentication server.

19. The method as in claim 13 wherein the web authentication application comprises a matcher module to compare the raw biometric data with biometric reference data associated with the user to determine a correlation between the raw biometric data and the biometric reference data.

20. The method as in claim 19 wherein a successful authentication is defined based on the correlation being above a specified threshold value, wherein an indication of a successful authentication is transmitted from the web authentication application to the authentication server.

21. The method as in claim 19 wherein the web authentication application further comprises a feature extraction module to extract one or more specified features from the raw biometric data, wherein the matcher module compares the extracted features against corresponding features from the biometric reference data.

22. The method as in claim 21 wherein in response to the web authentication application generating a successful authentication indication, the user is provided with access to one or more resources managed by a relying party.

23. The method as in claim 19 wherein the web authentication application is further configured to register with the authentication server using a registration process, wherein the web authentication application comprising a feature extraction module to extract specified features of the raw biometric data during registration to generate biometric reference data, the biometric reference data being stored within a secure storage accessible by the matcher module.

24. The method as in claim 23 wherein the registration process further comprises:
   generating a public/private key pair on the client; and
   transmitting a public key of the key pair to the authentication server, wherein the authentication server associates the public key with an account of the user and stores the public key in a secure storage.

\* \* \* \* \*